United States Patent
Landow et al.

(10) Patent No.: US 10,091,017 B2
(45) Date of Patent: Oct. 2, 2018

(54) PERSONALIZED HOME AUTOMATION CONTROL BASED ON INDIVIDUALIZED PROFILING

(71) Applicant: EchoStar Technologies L.L.C., Englewood, CO (US)

(72) Inventors: Kate Megan Carney Landow, Denver, CO (US); Leslie Ann Harper, Highlands Ranch, CO (US); Rajiv Singh Cullen Pal, Denver, CO (US); Marissa Brooke Mwendwa, Aurora, CO (US)

(73) Assignee: EchoStar Technologies International Corporation, Englewood, CO (US)

( * ) Notice: Subject to any disclaimer, the term of this patent is extended or adjusted under 35 U.S.C. 154(b) by 157 days.

(21) Appl. No.: 14/985,151

(22) Filed: Dec. 30, 2015

(65) Prior Publication Data

US 2017/0195130 A1 Jul. 6, 2017

(51) Int. Cl.
*H04L 12/28* (2006.01)
*G05B 19/042* (2006.01)

(52) U.S. Cl.
CPC ...... *H04L 12/2816* (2013.01); *G05B 19/0428* (2013.01); *G05B 2219/2642* (2013.01)

(58) Field of Classification Search
CPC .............. H04L 12/2816; G05B 2219/2642
See application file for complete search history.

(56) References Cited

U.S. PATENT DOCUMENTS 3,803,575 A  4/1974 Gotanda
4,127,966 A 12/1978 Schmidt
(Continued)

FOREIGN PATENT DOCUMENTS

CA   2 267 988 A1   4/1998
CH    702136 B1    5/2011
(Continued)

OTHER PUBLICATIONS

"Acoustic/Ultrasound Ultrasonic Flowmeter Basics," Questex Media Group LLC, accessed on Dec. 16, 2014, 4 pages. Retrieved from http://www.sensorsmag.com/sensors/acoustic-ultrasound/ultrasonic-flowmeter-basics-842.
(Continued)

*Primary Examiner* — Mark Connolly
(74) *Attorney, Agent, or Firm* — Kilpatrick Townsend & Stockton LLP

(57) ABSTRACT

Disclosed are methods, systems, and non-transitory, machine-readable media that facilitate personalized home automation control based at least in part on individualized protocol. First sensor data may be received, and may be indicative of an identified individual that is sensed by a set of sensors. A particularized pattern of activity of individual may be determined. Second sensor data may be indicative of an unidentified individual. Identification rules specified by a stored protocol record may include criteria for identifying sensed individuals. The second sensor data and/or identification information from another data source may be analyzed to identify the unidentified individual. A home automation rule may be determined based on the particularized pattern, which rule may include an anticipation of an operational setting of a home automation device. The home automation device may be instructed based on the determined home automation rule.

20 Claims, 7 Drawing Sheets

(56) References Cited

U.S. PATENT DOCUMENTS

| | | |
|---|---|---|
| 4,386,436 A | 5/1983 | Kocher et al. |
| 4,581,606 A | 4/1986 | Mallory |
| 4,694,607 A | 9/1987 | Ishida et al. |
| 4,728,949 A | 3/1988 | Platte et al. |
| 4,959,713 A | 9/1990 | Morotomi et al. |
| 5,400,246 A | 3/1995 | Wilson et al. |
| 5,770,896 A | 6/1998 | Nakajima |
| 5,805,442 A | 9/1998 | Crater et al. |
| 5,822,012 A | 10/1998 | Jeon et al. |
| 5,886,638 A | 3/1999 | Tanguay |
| 5,894,331 A | 4/1999 | Yang |
| 5,926,090 A | 7/1999 | Taylor et al. |
| 5,970,030 A | 10/1999 | Dimitri et al. |
| 6,081,758 A | 6/2000 | Parvulescu |
| 6,104,334 A | 8/2000 | Allport |
| 6,107,918 A | 8/2000 | Klein et al. |
| 6,107,935 A | 8/2000 | Comerford et al. |
| 6,111,517 A | 8/2000 | Atick et al. |
| 6,119,088 A | 9/2000 | Ciluffo |
| 6,142,913 A | 11/2000 | Ewert |
| 6,182,094 B1 | 1/2001 | Humpleman et al. |
| 6,225,938 B1 | 5/2001 | Hayes et al. |
| 6,286,764 B1 | 9/2001 | Garvey et al. |
| 6,330,621 B1 | 12/2001 | Bakke et al. |
| 6,337,899 B1 | 1/2002 | Alcendor et al. |
| 6,377,858 B1 | 4/2002 | Koeppe |
| 6,405,284 B1 | 6/2002 | Bridge |
| 6,415,257 B1 | 7/2002 | Jungua et al. |
| 6,445,287 B1 | 9/2002 | Schofield et al. |
| 6,502,166 B1 | 12/2002 | Cassidy |
| 6,529,230 B1 | 3/2003 | Chong |
| 6,543,051 B1 | 4/2003 | Manson et al. |
| 6,553,375 B1 | 4/2003 | Huang et al. |
| 6,663,375 B1 | 8/2003 | Huang et al. |
| 6,646,676 B1 | 11/2003 | DaGraca et al. |
| 6,662,282 B2 | 12/2003 | Cochran |
| 6,744,771 B1 | 6/2004 | Barber et al. |
| 6,748,343 B2 | 6/2004 | Alexander et al. |
| 6,751,657 B1 | 6/2004 | Zothner |
| 6,756,998 B1 | 6/2004 | Bilger |
| 6,792,319 B1 | 9/2004 | Bilger |
| 6,876,889 B1 | 4/2005 | Lortz et al. |
| 6,891,838 B1 | 5/2005 | Petite et al. |
| 6,931,104 B1 | 8/2005 | Foster et al. |
| 6,976,187 B2 | 12/2005 | Amott et al. |
| 6,989,731 B1 | 1/2006 | Kawai et al. |
| 7,009,528 B2 | 3/2006 | Griep |
| 7,010,332 B1 | 3/2006 | Irvin et al. |
| 7,081,830 B2 | 7/2006 | Shimba et al. |
| 7,082,359 B2 | 7/2006 | Breed |
| 7,088,238 B2 | 8/2006 | Karaoguz et al. |
| 7,103,545 B2 | 9/2006 | Furuta |
| 7,143,298 B2 | 11/2006 | Wells et al. |
| 7,216,002 B1 | 5/2007 | Anderson |
| 7,234,074 B2 | 6/2007 | Cohn et al. |
| 7,260,538 B2 | 8/2007 | Calderone et al. |
| 7,346,917 B2 | 3/2008 | Gatto et al. |
| 7,372,370 B2 | 5/2008 | Stults et al. |
| 7,386,666 B1 | 6/2008 | Beauchamp et al. |
| 7,391,319 B1 | 6/2008 | Walker |
| 7,395,369 B2 | 7/2008 | Sepez et al. |
| 7,395,546 B1 | 7/2008 | Asmussen |
| 7,529,677 B1 | 5/2009 | Wittenberg |
| 7,574,494 B1 | 8/2009 | Mayernick et al. |
| 7,579,945 B1 | 8/2009 | Richter et al. |
| 7,590,703 B2 | 9/2009 | Cashman et al. |
| 7,640,351 B2 | 12/2009 | Reckamp et al. |
| 7,659,814 B2 | 2/2010 | Chen et al. |
| 7,694,005 B2 | 4/2010 | Reckamp et al. |
| 7,739,718 B1 | 6/2010 | Young et al. |
| 7,861,034 B2 | 12/2010 | Yamamoto et al. |
| 7,870,232 B2 | 1/2011 | Reckamp et al. |
| 7,945,297 B2 | 5/2011 | Philipp |
| 7,969,318 B2 | 6/2011 | White et al. |
| 8,013,730 B2 | 9/2011 | Oh et al. |
| 8,042,048 B2 | 10/2011 | Wilson et al. |
| 8,086,757 B2 | 12/2011 | Chang |
| 8,106,768 B2 | 1/2012 | Neumann |
| 8,156,368 B2 | 4/2012 | Chambliss et al. |
| 8,171,148 B2 | 4/2012 | Lucas et al. |
| 8,179,248 B2 | 5/2012 | Eakle, Jr. |
| 8,180,735 B2 | 5/2012 | Ansari et al. |
| 8,201,261 B2 | 6/2012 | Barfield et al. |
| 8,221,290 B2 | 7/2012 | Vincent et al. |
| 8,275,143 B2 | 9/2012 | Johnson |
| 8,289,157 B2 | 10/2012 | Patenaude et al. |
| 8,290,545 B2 | 10/2012 | Terlizzi |
| 8,310,335 B2 | 11/2012 | Sivakkolundhu |
| 8,316,413 B2 | 11/2012 | Crabtree |
| 8,320,578 B2 | 11/2012 | Kahn et al. |
| 8,335,312 B2 | 12/2012 | Gerhardt et al. |
| 8,350,694 B1 | 1/2013 | Trundle et al. |
| 8,355,886 B2 | 1/2013 | Ollivier et al. |
| 8,413,204 B2 | 4/2013 | White et al. |
| 8,436,902 B2 | 5/2013 | Kuehnle |
| 8,498,572 B1 | 7/2013 | Schooley et al. |
| 8,516,087 B2 | 8/2013 | Wilson et al. |
| 8,533,144 B1 | 9/2013 | Reeser et al. |
| 8,539,567 B1 | 9/2013 | Logue et al. |
| 8,550,368 B2 | 10/2013 | Butler et al. |
| 8,619,136 B2 | 12/2013 | Howarter et al. |
| 8,620,841 B1 | 12/2013 | Filson et al. |
| 8,644,525 B2 | 2/2014 | Bathurst et al. |
| 8,645,327 B2 | 2/2014 | Falkenburg et al. |
| 8,667,529 B2 | 3/2014 | Taxier |
| 8,750,576 B2 | 6/2014 | Huang et al. |
| 8,780,201 B1 | 7/2014 | Scalisi et al. |
| 8,781,508 B1 | 7/2014 | Blakely |
| 8,786,698 B2 | 7/2014 | Chen et al. |
| 8,799,413 B2 | 8/2014 | Taylor et al. |
| 8,818,898 B2 | 8/2014 | Schlossberg et al. |
| 8,898,709 B2 | 11/2014 | Crabtree |
| 8,923,823 B1 | 12/2014 | Wilde |
| 8,930,700 B2 | 1/2015 | Welopolski |
| 8,948,793 B1 | 2/2015 | Birkhold et al. |
| 8,965,170 B1 | 2/2015 | Benea et al. |
| 9,019,111 B1 | 4/2015 | Sloo et al. |
| 9,049,567 B2 | 6/2015 | Le Guen et al. |
| 9,191,804 B1 | 11/2015 | Paczkowski et al. |
| 9,237,141 B2 | 1/2016 | Logue et al. |
| 9,246,921 B1 | 1/2016 | Vlaminck et al. |
| 9,258,593 B1 | 2/2016 | Chen et al. |
| 9,286,482 B1 | 3/2016 | Dumont et al. |
| 9,338,054 B2 | 5/2016 | Russell |
| 9,347,242 B2 | 5/2016 | Cregg et al. |
| 9,353,500 B1 | 5/2016 | Andreski |
| 9,443,142 B2 | 9/2016 | Reynolds, Jr. |
| 9,462,041 B1 | 10/2016 | Hagins et al. |
| 9,495,860 B2 | 11/2016 | Lett |
| 9,511,259 B2 | 12/2016 | Mountain |
| 9,589,448 B1 | 3/2017 | Schneider et al. |
| 9,599,981 B2 | 3/2017 | Crabtree |
| 9,621,959 B2 | 4/2017 | Mountain |
| 9,628,286 B1 | 4/2017 | Nguyen et al. |
| 9,632,746 B2 | 4/2017 | Keipert et al. |
| 9,633,186 B2 | 4/2017 | Ingrassia, Jr. et al. |
| 9,729,989 B2 | 8/2017 | Marten |
| 9,769,522 B2 | 9/2017 | Richardson |
| 9,772,612 B2 | 9/2017 | McCarthy et al. |
| 9,798,309 B2 | 10/2017 | Tirpak |
| 9,824,578 B2 | 11/2017 | Burton et al. |
| 9,835,434 B1 | 12/2017 | Sloo et al. |
| 9,838,736 B2 | 12/2017 | Smith et al. |
| 9,882,736 B2 | 1/2018 | Lett |
| 9,888,129 B2 | 2/2018 | Russell |
| 9,900,177 B2 | 2/2018 | Holley |
| 9,912,492 B2 | 3/2018 | McCarthy et al. |
| 9,967,614 B2 | 5/2018 | McCarthy |
| 9,977,587 B2 | 5/2018 | Mountain |
| 9,983,011 B2 | 5/2018 | Mountain |
| 9,989,507 B2 | 6/2018 | Benn |
| 2001/0012998 A1 | 8/2001 | Jouet et al. |
| 2002/0003493 A1 | 1/2002 | Durst et al. |
| 2002/0019725 A1 | 2/2002 | Petite |

(56) References Cited

U.S. PATENT DOCUMENTS

| | | |
|---|---|---|
| 2002/0063633 A1 | 5/2002 | Park |
| 2002/0080238 A1 | 6/2002 | Ohmura |
| 2002/0193989 A1 | 12/2002 | Geilhufe et al. |
| 2003/0005431 A1 | 1/2003 | Shinohara |
| 2003/0052789 A1 | 3/2003 | Colmenarez et al. |
| 2003/0097452 A1 | 5/2003 | Kim et al. |
| 2003/0126593 A1 | 7/2003 | Mault |
| 2003/0133551 A1 | 7/2003 | Kahn |
| 2003/0140352 A1 | 7/2003 | Kim |
| 2003/0154242 A1 | 8/2003 | Hayes et al. |
| 2003/0192600 A1 | 10/2003 | Ford |
| 2003/0201900 A1 | 10/2003 | Bachinski et al. |
| 2004/0019489 A1 | 1/2004 | Funk et al. |
| 2004/0036579 A1 | 2/2004 | Megerle |
| 2004/0117038 A1 | 6/2004 | Karaoguz et al. |
| 2004/0117843 A1 | 6/2004 | Karaoguz et al. |
| 2004/0121725 A1 | 6/2004 | Matsui |
| 2004/0128034 A1 | 7/2004 | Lenker et al. |
| 2004/0143838 A1 | 7/2004 | Rose |
| 2004/0148419 A1 | 7/2004 | Chen et al. |
| 2004/0148632 A1 | 7/2004 | Park et al. |
| 2004/0260407 A1 | 12/2004 | Wimsatt |
| 2004/0266419 A1 | 12/2004 | Arling et al. |
| 2005/0038875 A1 | 2/2005 | Park |
| 2005/0049862 A1 | 3/2005 | Choi et al. |
| 2005/0106267 A1 | 5/2005 | Frykman et al. |
| 2005/0159823 A1 | 7/2005 | Hayes et al. |
| 2005/0166065 A1* | 7/2005 | Eytchison ............... H04L 63/08 |
| | | 713/189 |
| 2005/0188315 A1 | 8/2005 | Campbell et al. |
| 2005/0200478 A1 | 9/2005 | Koch et al. |
| 2005/0245292 A1 | 11/2005 | Bennett et al. |
| 2005/0252622 A1 | 11/2005 | Reid |
| 2005/0264698 A1 | 12/2005 | Eshleman |
| 2005/0289614 A1 | 12/2005 | Baek et al. |
| 2006/0011145 A1 | 1/2006 | Kates |
| 2006/0059977 A1 | 3/2006 | Kates |
| 2006/0087428 A1 | 4/2006 | Wolfe et al. |
| 2006/0115156 A1* | 6/2006 | Nakajima ........... G06K 9/00362 |
| | | 382/190 |
| 2006/0136968 A1 | 6/2006 | Han et al. |
| 2006/0143679 A1 | 6/2006 | Yamada et al. |
| 2006/0155389 A1 | 7/2006 | Pessolano et al. |
| 2006/0186740 A1 | 8/2006 | Von Gunten |
| 2006/0192680 A1 | 8/2006 | Scuka et al. |
| 2006/0244624 A1 | 11/2006 | Wang et al. |
| 2006/0253894 A1 | 11/2006 | Bookman et al. |
| 2007/0044119 A1 | 2/2007 | Sullivan et al. |
| 2007/0078910 A1 | 4/2007 | Bopardikar |
| 2007/0129220 A1 | 6/2007 | Bardha |
| 2007/0135225 A1 | 6/2007 | Nieminen et al. |
| 2007/0142022 A1 | 6/2007 | Madonna et al. |
| 2007/0146545 A1 | 6/2007 | Iwahashi |
| 2007/0150460 A1 | 6/2007 | Evans |
| 2007/0157258 A1 | 7/2007 | Jung et al. |
| 2007/0192486 A1 | 8/2007 | Wilson et al. |
| 2007/0194922 A1 | 8/2007 | Nathan et al. |
| 2007/0256085 A1 | 11/2007 | Reckamp et al. |
| 2007/0271518 A1 | 11/2007 | Tischer et al. |
| 2007/0275670 A1 | 11/2007 | Chen et al. |
| 2007/0279244 A1 | 12/2007 | Haughawout et al. |
| 2007/0280504 A1 | 12/2007 | Badawy et al. |
| 2008/0019392 A1 | 1/2008 | Lee |
| 2008/0021971 A1 | 1/2008 | Halgas |
| 2008/0022322 A1 | 1/2008 | Grannan et al. |
| 2008/0046930 A1 | 2/2008 | Smith et al. |
| 2008/0062258 A1 | 3/2008 | Bentkovski et al. |
| 2008/0062965 A1 | 3/2008 | Silva et al. |
| 2008/0092199 A1 | 4/2008 | McCarthy et al. |
| 2008/0109095 A1 | 5/2008 | Braithwaite et al. |
| 2008/0114963 A1 | 5/2008 | Cannon et al. |
| 2008/0120639 A1 | 5/2008 | Walter et al. |
| 2008/0123825 A1 | 5/2008 | Abramson et al. |
| 2008/0140736 A1 | 6/2008 | Jarno |
| 2008/0144884 A1 | 6/2008 | Habibi |
| 2008/0163330 A1 | 7/2008 | Sparrell |
| 2008/0179053 A1 | 7/2008 | Kates |
| 2008/0236214 A1 | 10/2008 | Han |
| 2008/0278635 A1 | 11/2008 | Hardacker et al. |
| 2008/0284905 A1 | 11/2008 | Chuang |
| 2008/0288876 A1 | 11/2008 | Fleming |
| 2008/0297660 A1 | 12/2008 | Shioya |
| 2009/0023554 A1 | 1/2009 | Shim |
| 2009/0027225 A1 | 1/2009 | Farley |
| 2009/0033505 A1 | 2/2009 | Jones et al. |
| 2009/0040013 A1 | 2/2009 | Ebrom et al. |
| 2009/0066320 A1 | 3/2009 | Posey |
| 2009/0069038 A1 | 3/2009 | Olague et al. |
| 2009/0083374 A1 | 3/2009 | Saint Clair |
| 2009/0112541 A1 | 4/2009 | Anderson et al. |
| 2009/0138507 A1 | 5/2009 | Burckart et al. |
| 2009/0146834 A1 | 6/2009 | Huang |
| 2009/0165069 A1 | 6/2009 | Kirchner |
| 2009/0167555 A1 | 7/2009 | Kohanek |
| 2009/0190040 A1 | 7/2009 | Watanabe et al. |
| 2009/0235992 A1 | 9/2009 | Armstrong |
| 2009/0249428 A1 | 10/2009 | White et al. |
| 2009/0270065 A1 | 10/2009 | Hamada et al. |
| 2009/0271203 A1 | 10/2009 | Resch et al. |
| 2009/0286654 A1 | 11/2009 | Rice |
| 2009/0307715 A1 | 12/2009 | Santamaria et al. |
| 2010/0031286 A1 | 2/2010 | Gupta et al. |
| 2010/0045471 A1 | 2/2010 | Meyers |
| 2010/0046918 A1 | 2/2010 | Takao et al. |
| 2010/0066507 A1 | 3/2010 | Myllymaki |
| 2010/0083371 A1 | 4/2010 | Bennetts et al. |
| 2010/0097225 A1 | 4/2010 | Petricoin, Jr. |
| 2010/0102082 A1 | 4/2010 | Ebrom et al. |
| 2010/0122284 A1 | 5/2010 | Yoon et al. |
| 2010/0131280 A1 | 5/2010 | Bogineni |
| 2010/0138007 A1 | 6/2010 | Clark et al. |
| 2010/0138858 A1 | 6/2010 | Velazquez et al. |
| 2010/0146445 A1 | 6/2010 | Kraut |
| 2010/0161082 A1 | 6/2010 | Ebrom et al. |
| 2010/0164732 A1 | 7/2010 | Wedig et al. |
| 2010/0211546 A1 | 8/2010 | Grohman et al. |
| 2010/0277300 A1 | 11/2010 | Cohn et al. |
| 2010/0283579 A1 | 11/2010 | Kraus et al. |
| 2010/0309004 A1 | 12/2010 | Grundler et al. |
| 2010/0321151 A1 | 12/2010 | Matsuura et al. |
| 2011/0003665 A1 | 1/2011 | Burton et al. |
| 2011/0018693 A1 | 1/2011 | Lim et al. |
| 2011/0030016 A1 | 2/2011 | Pino et al. |
| 2011/0032423 A1 | 2/2011 | Jing et al. |
| 2011/0093126 A1 | 4/2011 | Toba et al. |
| 2011/0119325 A1 | 5/2011 | Paul et al. |
| 2011/0139076 A1 | 6/2011 | Pu et al. |
| 2011/0140832 A1 | 6/2011 | Vinkenvleugel et al. |
| 2011/0150432 A1 | 6/2011 | Paul et al. |
| 2011/0156862 A1 | 6/2011 | Langer |
| 2011/0157468 A1 | 6/2011 | Dai |
| 2011/0167250 A1 | 7/2011 | Dicks et al. |
| 2011/0187928 A1 | 8/2011 | Crabtree |
| 2011/0187930 A1 | 8/2011 | Crabtree |
| 2011/0187931 A1 | 8/2011 | Kim |
| 2011/0202956 A1 | 8/2011 | Connelly et al. |
| 2011/0267180 A1 | 11/2011 | Ferringo et al. |
| 2011/0270549 A1 | 11/2011 | Jeansonne et al. |
| 2011/0282837 A1 | 11/2011 | Gounares et al. |
| 2011/0283311 A1 | 11/2011 | Luong |
| 2011/0285528 A1 | 11/2011 | Weinstein et al. |
| 2011/0295396 A1 | 12/2011 | Chinen et al. |
| 2011/0296463 A1 | 12/2011 | Suslov |
| 2012/0019388 A1 | 1/2012 | Kates et al. |
| 2012/0047083 A1 | 2/2012 | Qiao et al. |
| 2012/0047532 A1 | 2/2012 | McCarthy |
| 2012/0059495 A1 | 3/2012 | Weiss et al. |
| 2012/0069246 A1 | 3/2012 | Thornberry et al. |
| 2012/0092183 A1 | 4/2012 | Corbett et al. |
| 2012/0094696 A1 | 4/2012 | Ahn et al. |
| 2012/0105724 A1 | 5/2012 | Candelore |
| 2012/0124245 A1 | 5/2012 | Reeves et al. |
| 2012/0124456 A1 | 5/2012 | Perez et al. |
| 2012/0124859 A1 | 5/2012 | May et al. |

(56) References Cited

U.S. PATENT DOCUMENTS

| | | |
|---|---|---|
| 2012/0154108 A1 | 6/2012 | Sugaya |
| 2012/0154138 A1 | 6/2012 | Cohn et al. |
| 2012/0164975 A1 | 6/2012 | Dodeja et al. |
| 2012/0167646 A1 | 7/2012 | Sharma et al. |
| 2012/0206269 A1 | 8/2012 | Wickman et al. |
| 2012/0226366 A1 | 9/2012 | Lee et al. |
| 2012/0226768 A1 | 9/2012 | Gaines et al. |
| 2012/0271472 A1 | 10/2012 | Brunner et al. |
| 2012/0271670 A1 | 10/2012 | Zaloom |
| 2012/0280802 A1 | 11/2012 | Yoshida et al. |
| 2012/0291068 A1 | 11/2012 | Khushoo et al. |
| 2012/0314713 A1 | 12/2012 | Singh et al. |
| 2012/0316876 A1 | 12/2012 | Jang et al. |
| 2012/0326835 A1 | 12/2012 | Cockrell et al. |
| 2013/0006400 A1 | 1/2013 | Caceres et al. |
| 2013/0013106 A1 | 1/2013 | Carelli et al. |
| 2013/0031037 A1 | 1/2013 | Brandt et al. |
| 2013/0046800 A1 | 2/2013 | Assi et al. |
| 2013/0049950 A1 | 2/2013 | Wohlert |
| 2013/0053063 A1 | 2/2013 | McSheffrey |
| 2013/0060358 A1 | 3/2013 | Li et al. |
| 2013/0070044 A1 | 3/2013 | Naidoo et al. |
| 2013/0074061 A1 | 3/2013 | Averbuch et al. |
| 2013/0090213 A1 | 4/2013 | Amini et al. |
| 2013/0120137 A1 | 5/2013 | Lehmann |
| 2013/0124192 A1 | 5/2013 | Lindmark et al. |
| 2013/0138757 A1 | 5/2013 | Ferron |
| 2013/0147604 A1 | 6/2013 | Jones et al. |
| 2013/0152139 A1 | 6/2013 | Davis et al. |
| 2013/0158717 A1 | 6/2013 | Zywicki et al. |
| 2013/0166073 A1 | 6/2013 | Pine et al. |
| 2013/0179926 A1 | 7/2013 | White et al. |
| 2013/0185750 A1 | 7/2013 | Ayoub |
| 2013/0204408 A1 | 8/2013 | Thiruvengada et al. |
| 2013/0219482 A1 | 8/2013 | Brandt |
| 2013/0238326 A1 | 9/2013 | Kim et al. |
| 2013/0242074 A1 | 9/2013 | Sekiguchi et al. |
| 2013/0247117 A1 | 9/2013 | Yamada et al. |
| 2013/0249688 A1 | 9/2013 | Nguyen et al. |
| 2013/0267383 A1 | 10/2013 | Watterson |
| 2013/0278828 A1 | 10/2013 | Todd |
| 2013/0289788 A1 | 10/2013 | Gupta et al. |
| 2013/0300576 A1 | 11/2013 | Sinsuan et al. |
| 2013/0318559 A1 | 11/2013 | Crabtree |
| 2013/0321637 A1 | 12/2013 | Frank et al. |
| 2013/0324247 A1 | 12/2013 | Esaki et al. |
| 2013/0325150 A1 | 12/2013 | Bury |
| 2014/0022051 A1 | 1/2014 | Levien et al. |
| 2014/0025798 A1 | 1/2014 | Apte et al. |
| 2014/0028546 A1 | 1/2014 | Jeon et al. |
| 2014/0070959 A1 | 3/2014 | Bhargava et al. |
| 2014/0089671 A1 | 3/2014 | Logue et al. |
| 2014/0095684 A1 | 4/2014 | Nonaka et al. |
| 2014/0101465 A1 | 4/2014 | Wang et al. |
| 2014/0129006 A1 | 5/2014 | Chen et al. |
| 2014/0135993 A1 | 5/2014 | Kang et al. |
| 2014/0140575 A1 | 5/2014 | Wolf |
| 2014/0142724 A1 | 5/2014 | Park et al. |
| 2014/0160360 A1 | 6/2014 | Hsu et al. |
| 2014/0167969 A1 | 6/2014 | Wedig et al. |
| 2014/0168277 A1 | 6/2014 | Ashley et al. |
| 2014/0181855 A1 | 6/2014 | Fife |
| 2014/0192197 A1 | 7/2014 | Hanko et al. |
| 2014/0192997 A1 | 7/2014 | Niu et al. |
| 2014/0201315 A1 | 7/2014 | Jacob et al. |
| 2014/0215505 A1 | 7/2014 | Balasubramanian et al. |
| 2014/0217905 A1 | 8/2014 | Clayton et al. |
| 2014/0218517 A1 | 8/2014 | Kim et al. |
| 2014/0222634 A1 | 8/2014 | Gordon et al. |
| 2014/0223548 A1 | 8/2014 | Wassingbo |
| 2014/0228062 A1 | 8/2014 | Rubowitz |
| 2014/0266669 A1 | 9/2014 | Fadell et al. |
| 2014/0266684 A1 | 9/2014 | Poder et al. |
| 2014/0282653 A1 | 9/2014 | Ariantaj et al. |
| 2014/0297001 A1 | 10/2014 | Silverman |
| 2014/0306833 A1 | 10/2014 | Ricci |
| 2014/0310075 A1 | 10/2014 | Ricci |
| 2014/0313014 A1 | 10/2014 | Huh et al. |
| 2014/0313032 A1 | 10/2014 | Sager et al. |
| 2014/0333529 A1 | 11/2014 | Kim et al. |
| 2014/0351832 A1 | 11/2014 | Cho et al. |
| 2014/0362201 A1 | 12/2014 | Nguyen et al. |
| 2014/0373074 A1 | 12/2014 | Hwang et al. |
| 2015/0008846 A1 | 1/2015 | Chen et al. |
| 2015/0015401 A1 | 1/2015 | Wedig et al. |
| 2015/0029096 A1 | 1/2015 | Ishihara |
| 2015/0054910 A1 | 2/2015 | Offen et al. |
| 2015/0061859 A1 | 3/2015 | Matsuoka et al. |
| 2015/0062343 A1 | 3/2015 | Hwang et al. |
| 2015/0066173 A1 | 3/2015 | Ellis et al. |
| 2015/0074259 A1 | 3/2015 | Ansari et al. |
| 2015/0082225 A1 | 3/2015 | Shearer |
| 2015/0084770 A1 | 3/2015 | Xiao et al. |
| 2015/0085184 A1 | 3/2015 | Vidal et al. |
| 2015/0097689 A1 | 4/2015 | Logue et al. |
| 2015/0100167 A1 | 4/2015 | Sloo et al. |
| 2015/0105880 A1 | 4/2015 | Slupik et al. |
| 2015/0106866 A1 | 4/2015 | Fujita |
| 2015/0113571 A1 | 4/2015 | Cholas et al. |
| 2015/0116113 A1 | 4/2015 | Caine et al. |
| 2015/0127712 A1 | 5/2015 | Fadell et al. |
| 2015/0131500 A1 | 5/2015 | Xie et al. |
| 2015/0137967 A1 | 5/2015 | Wedig et al. |
| 2015/0142991 A1 | 5/2015 | Zaloom |
| 2015/0143406 A1 | 5/2015 | Cho et al. |
| 2015/0143408 A1 | 5/2015 | Sallas |
| 2015/0145643 A1 | 5/2015 | Fadell et al. |
| 2015/0154850 A1 | 6/2015 | Fadell et al. |
| 2015/0156030 A1 | 6/2015 | Fadell et al. |
| 2015/0156031 A1 | 6/2015 | Fadell et al. |
| 2015/0156612 A1 | 6/2015 | Vemaulapalli |
| 2015/0159401 A1 | 6/2015 | Patrick et al. |
| 2015/0160623 A1 | 6/2015 | Holley |
| 2015/0160634 A1 | 6/2015 | Smith et al. |
| 2015/0160635 A1 | 6/2015 | Schofield et al. |
| 2015/0160636 A1 | 6/2015 | McCarthy et al. |
| 2015/0160663 A1 | 6/2015 | McCarthy et al. |
| 2015/0160935 A1 | 6/2015 | Nye |
| 2015/0161452 A1 | 6/2015 | McCarthy et al. |
| 2015/0161882 A1 | 6/2015 | Lett |
| 2015/0162006 A1 | 6/2015 | Kummer |
| 2015/0163411 A1 | 6/2015 | McCarthy, III et al. |
| 2015/0163412 A1 | 6/2015 | Holley et al. |
| 2015/0163535 A1 | 6/2015 | McCarthy et al. |
| 2015/0172742 A1 | 6/2015 | Richardson |
| 2015/0180708 A1 | 6/2015 | Jacob et al. |
| 2015/0192914 A1 | 7/2015 | Slupik |
| 2015/0198941 A1 | 7/2015 | Pederson |
| 2015/0241860 A1 | 8/2015 | Raid |
| 2015/0260424 A1 | 9/2015 | Fadell et al. |
| 2015/0281824 A1 | 10/2015 | Nguyen et al. |
| 2015/0304689 A1 | 10/2015 | Warren |
| 2015/0309487 A1 | 10/2015 | Lyman |
| 2015/0325096 A1 | 11/2015 | Hatch |
| 2015/0334069 A1 | 11/2015 | Winston et al. |
| 2015/0341599 A1 | 11/2015 | Carey |
| 2015/0347910 A1 | 12/2015 | Fadell et al. |
| 2015/0365787 A1 | 12/2015 | Farrell |
| 2016/0029153 A1 | 1/2016 | Linn et al. |
| 2016/0041565 A1 | 2/2016 | Edwards |
| 2016/0047569 A1 | 2/2016 | Fadell et al. |
| 2016/0063854 A1 | 3/2016 | Burton et al. |
| 2016/0066046 A1 | 3/2016 | Mountain |
| 2016/0091471 A1 | 3/2016 | Benn |
| 2016/0098309 A1 | 4/2016 | Kim |
| 2016/0100696 A1 | 4/2016 | Palashewski et al. |
| 2016/0109864 A1 | 4/2016 | Lonn |
| 2016/0121161 A1 | 5/2016 | Mountain |
| 2016/0123741 A1 | 5/2016 | Mountain |
| 2016/0163168 A1 | 6/2016 | Brav et al. |
| 2016/0182249 A1 | 6/2016 | Lea |
| 2016/0189527 A1 | 6/2016 | Peterson et al. |
| 2016/0191912 A1 | 6/2016 | Lea et al. |
| 2016/0191990 A1 | 6/2016 | McCarthy |

(56) References Cited

U.S. PATENT DOCUMENTS

| | | | |
|---|---|---|---|
| 2016/0195602 | A1 | 7/2016 | Meadow |
| 2016/0195856 | A1* | 7/2016 | Spero .................... G06N 5/046 700/90 |
| 2016/0196731 | A1 | 7/2016 | Aich et al. |
| 2016/0203700 | A1 | 7/2016 | Bruhn et al. |
| 2016/0234034 | A1 | 8/2016 | Mahar et al. |
| 2016/0248598 | A1 | 8/2016 | Lin et al. |
| 2016/0256485 | A1 | 9/2016 | Wager et al. |
| 2016/0260135 | A1 | 9/2016 | Zomet et al. |
| 2016/0285644 | A1 | 9/2016 | Lu et al. |
| 2016/0286327 | A1 | 9/2016 | Marten |
| 2016/0323548 | A1 | 11/2016 | Khot et al. |
| 2016/0334811 | A1 | 11/2016 | Marten |
| 2016/0335423 | A1 | 11/2016 | Beals |
| 2016/0338179 | A1 | 11/2016 | Aliakseyeu et al. |
| 2016/0342379 | A1 | 11/2016 | Keipert et al. |
| 2016/0366746 | A1 | 12/2016 | van de Ven et al. |
| 2017/0005822 | A1 | 1/2017 | Gao |
| 2017/0006533 | A1 | 1/2017 | Gould et al. |
| 2017/0041886 | A1 | 2/2017 | Baker et al. |
| 2017/0048476 | A1 | 2/2017 | Freiin von Kapri et al. |
| 2017/0051925 | A1 | 2/2017 | Stefanski et al. |
| 2017/0054615 | A1 | 2/2017 | Wilson |
| 2017/0061750 | A1 | 3/2017 | Eyring et al. |
| 2017/0082987 | A1 | 3/2017 | Reddy et al. |
| 2017/0105190 | A1 | 4/2017 | Logan et al. |
| 2017/0127124 | A9 | 5/2017 | Wilson et al. |
| 2017/0146964 | A1 | 5/2017 | Beals |
| 2017/0168469 | A1 | 6/2017 | Marten et al. |
| 2017/0176961 | A1 | 6/2017 | Tirpak |
| 2017/0187993 | A1 | 6/2017 | Martch et al. |
| 2017/0191693 | A1 | 7/2017 | Bruhn et al. |
| 2017/0191695 | A1 | 7/2017 | Bruhn et al. |
| 2018/0027290 | A1 | 1/2018 | Richardson |
| 2018/0038029 | A1 | 2/2018 | Beals |
| 2018/0061158 | A1 | 3/2018 | Greene |

FOREIGN PATENT DOCUMENTS

| | | |
|---|---|---|
| CN | 105814555 A | 7/2016 |
| DE | 3707284 A1 | 9/1988 |
| DE | 4012253 C1 | 4/1991 |
| DE | 10 208 451 A1 | 9/2003 |
| DE | 10 2012 106 719 A1 | 1/2014 |
| EP | 720136 A2 | 7/1996 |
| EP | 743410 A2 | 11/1996 |
| EP | 2 736 027 A1 | 5/2014 |
| EP | 3 080 677 A1 | 10/2016 |
| EP | 3 080 710 A1 | 10/2016 |
| FR | 834856 A | 12/1938 |
| FR | 947943 A | 7/1949 |
| GB | 1445705 A | 9/1976 |
| GB | 2 304 952 A | 3/1997 |
| JP | 2008148016 A | 6/2008 |
| WO | 93/20544 A1 | 10/1993 |
| WO | 2004/068386 A1 | 8/2004 |
| WO | 2011/095567 A1 | 8/2011 |
| WO | 2011/149473 A1 | 12/2011 |
| WO | 2014/068556 A1 | 5/2014 |
| WO | 2015/179120 A1 | 11/2015 |
| WO | 2016/034880 A1 | 3/2016 |
| WO | 2016/066399 A1 | 5/2016 |
| WO | 2016/066442 A1 | 5/2016 |
| WO | 2016/182696 A1 | 11/2016 |
| WO | 2017/116533 A1 | 7/2017 |
| WO | 2018/039161 A1 | 3/2018 |

OTHER PUBLICATIONS

Author Unknown, "Voice Activated TV using the Amulet Remote for Media Center," AmuletDevices.com, accessed on Jul. 14, 2014, 1 page. Retrieved from http://www.amuletdevices.com/index.php/Features/television.html.

Author Unknown, "App for Samsung Smart TV®," Crestron Electronics, Inc., accessed on Jul. 14, 2014, 3 pages. Retrieved from http://www.crestron.com/products/smart_tv_television_apps/.

Author Unknown, "AllJoyn Onboarding Service Frameworks," Qualcomm Connected Experiences, Inc., accessed on Jul. 15, 2014, 9 pages. Retrieved from https://www.alljoyn.org.

"Do you want to know how to find water leaks? Use a Bravedo Water Alert Flow Monitor to find out!", Bravedo.com, accessed Dec. 16, 2014, 10 pages. Retrieved from http://bravedo.com/.

"Flow Pulse®, Non-invasive clamp-on flow monitor for pipes," Pulsar Process Measurement Ltd, accessed on Dec. 16, 2014, 2 pages.Retrieved from http://www.pulsar-pm.com/product-types/flow/flow-pulse.aspx.

Fong A.C.M. et al, "Indoor air quality control for asthma patients using smart home technology," Consumer Electronics (ISCE), 2011 IEEE 15th International Symposium on, IEEE, Jun. 14, 2011, pp. 18-19, XP032007803, DOI: 10.1109/ISCE.2011.5973774, ISBN: 978-1-61284-843-3, Abstract and sections 3 and 4.

"International Building Code Excerpts, Updated with recent code changes that impact electromagnetic locks," Securitron, Assa Abloy, IBC/IFC 2007 Supplement and 2009, "Finally-some relief and clarification", 2 pages.Retrieved from: www.securitron.com/Other/ . . . /New_IBC-IFC_Code_Language.pdf.

"Introduction to Ultrasonic Doppler Flowmeters," OMEGA Engineering inc., accessed on Dec. 16, 2014, 3 pages. Retrieved from http://www.omega.com/prodinfo/ultrasonicflowmeters.html.

Lamonica, M., "CES 2010 Preview: Green comes in many colors," retrieved from CNET.com (http://ces.cnetcom/8301-31045_1-10420381-269.html), Dec. 22, 2009, 2 pages.

Robbins, Gordon, Deputy Chief, "Addison Fire Department Access Control Installation," 2006 International Fire Code, Section 1008. 1.3.4, 4 pages.

Shunfeng Cheng et al., "A Wireless Sensor System for Prognostics and Health Management," IEEE Sensors Journal, IEEE Service Center, New York, NY, US, vol. 10, No. 4, Apr. 1, 2010, pp. 856-862, XP011304455, ISSN: 1530-437X, Sections 2 and 3.

"Ultrasonic Flow Meters," RS Hydro Ltd, accessed on Dec. 16, 2014, 3 pages. Retrieved from http://www.rshydro.co.uk/ultrasonic-flowmeter.shtml.

Wang et al., "Mixed Sound Event Verification on Wireless Sensor Network for Home Automation," IEEE Transactions on Industrial Informatics, vol. 10, No. 1, Feb. 2014, 10 pages.

International Search Report and Written Opinion for PCT/EP2011/051608 dated May 30, 2011, 13 pages.

International Preliminary Report on Patentability for PCT/EP2011/051608 dated Aug. 16, 2012, 8 pages.

International Search Report and Written Opinion for PCT/US2014/053876 dated Nov. 26, 2014, 8 pages.

International Search Report and Written Opinion for PCT/US2014/055441 dated Dec. 4, 2014, 10 pages.

International Search Report and Written Opinion for PCT/US2014/055476 dated Dec. 30, 2014, 10 pages.

International Search Report and Written Opinion for PCT/EP2015/070286 dated Nov. 5, 2015, 13 pages.

International Search Report and Written Opinion for PCT/GB2015/052544 dated Nov. 6, 2015, 10 pages.

International Search Report and Written Opinion for PCT/GB2015/052457 dated Nov. 13, 2015, 11 pages.

International Search Report and Written Opinion for PCT/EP2015/073299 dated Jan. 4, 2016, 12 pages.

International Search Report and Written Opinion for PCT/EP2015/073936 dated Feb. 4, 2016, all pages.

Mexican Institute of Industrial Property Office Action dated Nov. 1, 2013, for Mex. Patent Appln No. MX/a/2012/008882 is not translated into English, 3 pages.

Mexican Institute of Industrial Property Notice of Allowance dated Feb. 10, 2014, for Mex. Patent Appln No. MX/a/2012/008882 , 1 page.

U.S. Appl. No. 14/470,352, filed Aug. 27, 2014 Non Final Office Action dated Nov. 20, 2015, 28 pages.

U.S. Appl. No. 12/700,310, filed Feb. 4, 2010, Office Action dated May 4, 2012, 15 pages.

(56) References Cited

OTHER PUBLICATIONS

U.S. Appl. No. 12/700,310, filed Feb. 4, 2010, Final Office Action dated Oct. 10, 2012, 16 pages.
U.S. Appl. No. 12/700,310, filed Feb. 4, 2010 Non-Final Office Action dated Apr. 1, 2013, 16 pages.
U.S. Appl. No. 12/700,310, filed Feb. 4, 2010 Non-Final Office Action dated Oct. 15, 2013, 15 pages.
U.S. Appl. No. 12/700,310, filed Feb. 4, 2010 Final Office Action dated Feb. 28, 2014, 17 pages.
U.S. Appl. No. 12/700,310, filed Feb. 4, 2010 Non-Final Office Action dated Aug. 14, 2014, 18 pages.
U.S. Appl. No. 12/700,310, filed Feb. 4, 2010 Non-Final Office Action dated Mar. 11, 2015, 35 pages.
U.S. Appl. No. 12/700,310, filed Feb. 4, 2010 Final Office Action dated Oct. 26, 2015, 19 pages.
U.S. Appl. No. 12/700,408, filed Feb. 4, 2010, Notice of Allowance dated Jul. 28, 2012, 8 pages.
U.S. Appl. No. 13/680,934, filed Nov. 19, 2012, Non-Final Office Action dated Oct. 2, 2013, 7 pages.
U.S. Appl. No. 13/680,934, filed Nov. 19, 2012, Final Office Action dated Feb. 10, 2014, 13 pages.
U.S. Appl. No. 13/680,934, filed Nov. 19, 2012, Notice of Allowance dated Apr. 30, 2014, 9 pages.
U.S. Appl. No. 13/680,934, filed Nov. 19, 2012, Notice of Allowance dated Jul. 25, 2014, 12 pages.
U.S. Appl. No. 14/107,132, filed Dec. 16, 2013, Non Final Office Action dated May 27, 2015, 26 pages.
U.S. Appl. No. 14/107,132, filed Dec. 16, 2013, Final Rejection dated Dec. 16, 2015, 32 pages.
U.S. Appl. No. 14/485,188, filed Sep. 12, 2014, Pre-Interview First Office Action dated Jul. 29, 2015, 20 pages.
U.S. Appl. No. 14/485,188, filed Sep. 12, 2014, Pre-Interview First Office Action dated Oct. 1, 2015, 10 pages.
U.S. Appl. No. 14/485,188, filed Sep. 12, 2014, Final Rejection dated Feb. 23, 2016, 22 pages.
U.S. Appl. No. 14/567,348, filed Dec. 11, 2014, Preinterview first office action dated Jan. 20, 2016, 23 pages.
U.S. Appl. No. 14/470,352, filed Aug. 27, 2014 Non Final Office Action dated Aug. 26, 2016, all pages.
U.S. Appl. No. 14/107,132, filed Dec. 16, 2013, Non Final Office Action dated Jul. 18, 2016, all pages.
U.S. Appl. No. 14/715,248, filed May 18, 2015, Non-Final Rejection dated Jul. 19, 2016, 34 pages.
U.S. Appl. No. 14/567,783, filed Dec. 11, 2014, Non Final Rejection dated Aug. 23, 2016, all pages.
U.S. Appl. No. 15/289,395, filed Oct. 10, 2016 Non-Final Rejection dated Jun. 19, 2017, all pages.
U.S. Appl. No. 14/497,130, filed Sep. 25, 2014, Final Rejection dated Aug. 4, 2017, all pages.
U.S. Appl. No. 14/981,501, filed Dec. 28, 2015, First Action Interview—office action dated Jul. 19, 2017, all pages.
U.S. Appl. No. 14/567,502, filed Dec. 11, 2014, Final Rejection dated Aug. 7, 2017, all pages.
Notification of Publication of Brazilian Application No. BR 11 2016 0112032 dated Aug. 8, 2017, 2 pages.
Supplementary European Search Report for EP 14868928 dated Jul. 7, 2017, 11 pages.
Notification of Publication of European Application No. 162004220 as EP 3166308 dated May 10, 2017, 2 pages.
U.S. Appl. No. 14/567,765, filed Dec. 11, 2014, Notice of Allowance dated May 24, 2017, all pages.
U.S. Appl. No. 14/567,754, filed Dec. 11, 2014, Final Rejection dated May 26, 2017, all pages.
U.S. Appl. No. 14/567,770, filed Dec. 11, 2014, Final Rejection dated Jun. 1, 2017, all pages.
U.S. Appl. No. 14/476,377, filed Sep. 3, 2014, Notice of Allowance dated May 19, 2017, all pages.
U.S. Appl. No. 14/709,791, filed May 12, 2015, Non Final Rejection dated May 31, 2017, all pages.
U.S. Appl. No. 14/470,352, filed Aug. 27, 2014 Final Office Action dated Mar. 17, 2016, all pages.
U.S. Appl. No. 14/567,765, filed Dec. 11, 2014, Preinterview first office action dated Apr. 8, 2016, 30 pages.
U.S. Appl. No. 14/577,717, filed Dec. 19, 2014, Preinterview first office action dated Apr. 4, 2016, 29 pages.
U.S. Appl. No. 14/584,075, filed Dec. 29, 2014, Non-Final Rejection dated Apr. 1, 2016, 40 pages.
U.S. Appl. No. 14/470,352, filed Aug. 27, 2014 Notice of Allowance dated Dec. 2, 2016, all pages.
U.S. Appl. No. 15/050,958, filed Feb. 23, 2016 Notice of Allowance dated Dec. 6, 2016, all pages.
U.S. Appl. No. 15/289,395, filed Oct. 10, 2016 Non-Final Rejection dated Dec. 2, 2016, all pages.
U.S. Appl. No. 14/107,132, filed Dec. 16, 2013, Notice of Allowance dated Jan. 18, 2017, all pages.
U.S. Appl. No. 14/485,188, filed Sep. 12, 2014, Final Rejection dated Nov. 25, 2016, 22 pages.
U.S. Appl. No. 14/577,717, filed Dec. 19, 2014, Final Office Action dated Dec. 19, 2016, all pages.
U.S. Appl. No. 14/567,783, filed Dec. 11, 2014, Final Rejection dated Dec. 20, 2016, all pages.
U.S. Appl. No. 15/075,412, filed Mar. 21, 2016, Non Final Rejection dated Dec. 21, 2016, all pages.
International Preliminary Report on Patentability for PCT/GB2015/052544 dated Mar. 7, 2017, all pages.
International Search Report and Written Opinion for PCT/US2016/057729 dated Mar. 28, 2017, all pages.
European Search Report for EP 16 20 0422 dated Jan. 13, 2017, all pages.
BDEJONG_CREE, "Cannot remove last user of a group even though members still exist," Microsoft Visual Studio forum site, Topic ID #58405, Response by Microsoft, Dec. 17, 2010) retrieved on Apr. 6, 2017 from: https://connect.microsoft.com/VisualStudio/feedback/details/580405/tfs-2010-cannont-remove-last-user-of-a-group-even-though-members-still-exists.
International Preliminary Report on Patentability for PCT/GB2015/052457 dated Feb. 28, 2017, all pages.
U.S. Appl. No. 14/485,188, filed Sep. 12, 2014, Non-Final Rejection dated Apr. 19, 2017, all pages.
U.S. Appl. No. 14/567,765, filed Dec. 11, 2014, Final Rejection dated Feb. 16, 2017, all pages.
U.S. Appl. No. 14/485,038, filed Sep. 12, 2014, Non Final Rejection dated Apr. 6, 2017, all pages.
U.S. Appl. No. 14/584,075, filed Dec. 29, 2014, Non-Final Rejection dated Mar. 10, 2017, all pages.
U.S. Appl. No. 14/710,331, filed May 12, 2015, Non-Final Rejection dated Mar. 10, 2017, all pages.
U.S. Appl. No. 14/566,977, filed Dec. 11, 2014, Final Rejection dated Feb. 10, 2017, all pages.
U.S. Appl. No. 14/671,299, filed Mar. 27, 2015, Notice of Allowance dated Apr. 17, 2017, all pages.
U.S. Appl. No. 14/565,853, filed Dec. 10, 2014, Non Final Rejection dated Mar. 10, 2017, all pages.
U.S. Appl. No. 15/075,412, filed Mar. 21, 2016, Final Rejection dated Apr. 17, 2017, all pages.
U.S. Appl. No. 14/497,130, filed Sep. 25, 2014, Non Final Rejection dated Feb. 8, 2017, all pages.
U.S. Appl. No. 14/528,402, filed Oct. 30, 2014, Non-Final Rejection dated Apr. 11, 2017, all pages.
U.S. Appl. No. 14/475,252, filed Sep. 2, 2014, Non-Final Rejection dated Apr. 12, 2017, all pages.
U.S. Appl. No. 14/832,821, filed Aug. 21, 2015, Non-Final Rejection dated Apr. 24, 2017, all pages.
U.S. Appl. No. 14/981,501, filed Dec. 28, 2015, Preinterview first office action dated Apr. 20, 2017, all pages.
U.S. Appl. No. 12/700,310, filed Feb. 4, 2010 Notice of Allowance dated Nov. 8, 2016, all pages.
U.S. Appl. No. 14/567,765, filed Dec. 11, 2014, First Action interview dated Oct. 18, 2016, all pages.
U.S. Appl. No. 14/584,075, filed Dec. 29, 2014, Final Rejection dated Oct. 6, 2016, all pages.

(56) References Cited

OTHER PUBLICATIONS

U.S. Appl. No. 14/566,977, filed Dec. 11, 2014, Non Final Rejection dated Oct. 3, 2016, all pages.
U.S. Appl. No. 14/567,754, filed Dec. 11, 2014, Non Final Rejection dated Nov. 4, 2016, all pages.
U.S. Appl. No. 14/567,770, filed Dec. 11, 2014, Non Final Rejection dated Nov. 4, 2016, all pages.
U.S. Appl. No. 14/671,299, filed Mar. 27, 2015, Non Final Rejection dated Oct. 28, 2016, all pages.
U.S. Appl. No. 14/476,377, filed Sep. 3, 2014, Non-Final Rejection dated Nov. 7, 2016, all pages.
Office Action for EP14868928.4 dated Sep. 23, 2016, all pages.
Notification of Publication of European Application No. 15763643.2 as EP 3189511 on Jul. 12, 2017, 1 pages.
Notification of Publication of Brazilian Application No. BR 11 2016 010376 9 dated Aug. 8, 2017, 1 page.
Supplementary European Search Report for EP 14870507 dated Jun. 28, 2017, all pages.
"Plug-In Carbon Monoxide & Natural Gas Alarm with Backup Battery Protection," Universal Security Instruments, Inc., 2011, 12 pages.
U.S. Appl. No. 14/553,763, filed Nov. 25, 2014 Preinterview first office action dated Oct. 6, 2017, all pages.
U.S. Appl. No. 14/584,075, filed Dec. 29, 2014, Final Rejection dated Sep. 9, 2017, all pages.
U.S. Appl. No. 14/952,580, filed Nov. 25, 2015, Non-Final Rejection dated Sep. 20, 2017, all pages.
U.S. Appl. No. 15/189,775, filed Jun. 22, 2016, Notice of Allowance dated Sep. 11, 2017, all pages.
U.S. Appl. No. 14/986,496, filed Dec. 31, 2015, Non-Final Rejection dated Sep. 26, 2017, all pages.
U.S. Appl. No. 14/710,331, filed May 12, 2015, Final Rejection dated Aug. 16, 2017, all pages.
Mark Edward Soper, "Absolute Beginner's Guide to Home Automation," 2005, Que Publishing, p. 57, 121.
U.S. Appl. No. 14/981,501, filed Dec. 28, 2015, Final Office Action dated Oct. 10, 2017, all pages.
International Search Report and Written Opinion for PCT/US2016/028126 dated Jun. 3, 2016, all pages.
U.S. Appl. No. 12/700,310, filed Feb. 4, 2010 Non-Final Office Action dated Jun. 16, 2016, 30 pages.
U.S. Appl. No. 14/528,739, filed Oct. 30, 2014 Notice of Allowance dated Jun. 23, 2016, 34 pages.
U.S. Appl. No. 14/485,188, filed Sep. 12, 2014, Non-Final Rejection dated Jun. 17, 2016, 29 pages.
U.S. Appl. No. 14/710,331, filed May 12, 2015, Non-Final Rejection dated May 20, 2016, 42 pages.
International Preliminary Report on Patentability for PCT/US2014/055441 dated Jun. 14, 2016, 8 pages.
International Preliminary Report on Patentability for PCT/US2014/053876 dated Jun. 14, 2016, 7 pages.
International Preliminary Report on Patentability for PCT/US2014/055476 dated Jun. 14, 2016, 9 pages.

Office Action CN Appln No. 201480067003.5 dated Jan. 19, 2018, all pages.
U.S. Appl. No. 14/952,580, filed Nov. 25, 2015, Notice of Allowance dated Feb. 12, 2018, all pages.
U.S. Appl. No. 14/528,402, filed Oct. 30, 2014, Notice of Allowance dated Jan. 29, 2018, all pages.
U.S. Appl. No. 14/970,235 Non Final Rejection dated Jan. 31, 2018, all pages.
U.S. Appl. No. 14/982,366, filed Dec. 29, 2015, Non-Final Rejection dated Nov. 1, 2017, all pages.
U.S. Appl. No. 15/246,079, filed Aug. 24, 2016, Non-Final Rejection dated Oct. 19, 2017, all pages.
U.S. Appl. No. 14/485,188, filed Sep. 12, 2014, Final Rejection dated Oct. 25, 2017, all pages.
U.S. Appl. No. 14/485,038, filed Sep. 12, 2014, Notice of Allowance dated Nov. 13, 2017, all pages.
U.S. Appl. No. 14/528,402, filed Oct. 30, 2014, Final Rejection dated Oct. 31, 2017, all pages.
U.S. Appl. No. 14/553,763, filed Nov. 25, 2014 Notice of Allowance dated Mar. 27, 2018, all pages.
U.S. Appl. No. 15/246,079, filed Aug. 24, 2016, Notice of Allowance dated Apr. 10, 2018, all pages.
International Preliminary Report on Patentability for PCT/US2016/028126 dated Nov. 14, 2017, all pages.
International Search Report and Written Opinion for PCT/US2017/047900 dated Nov. 24, 2017.
Ravindran, et al., "Information-centric Networking based Homenet," 2013 IFIP/IEEE International Symposium on Integrated Network Management (IM 2013), Ghent, 2013, pp. 1102-1108.
Mantoro, et al., "Web-enabled Smart Home Using Wireless Node Infrastructure," Proceedings of the 9th International Conference on Advances in Mobile Computing and Multimedia. ACM, 2011, pp. 72-79.
Shariqsuhail, et al., "Multi-Functional Secured Smart Home," Advances in Computing, Communications and Informatics (ICACCI), 2016 International Conference on. IEEE, 2016, pp. 2629-2634.
U.S. Appl. No. 14/986,483, filed Dec. 31, 2015, Non-Final Rejection dated Dec. 1, 2017, all pages.
U.S. Appl. No. 14/584,075, filed Dec. 29, 2014, Notice of Allowance dated Dec. 26, 2017, all pages.
U.S. Appl. No. 14/710,331, filed May 12, 2015, Notice of Allowance dated Dec. 7, 2017, all pages.
U.S. Appl. No. 14/832,821, filed Aug. 21, 2015, Notice of Allowance dated Dec. 18, 2017, all pages.
U.S. Appl. No. 14/986,483, filed Dec. 31, 2015, Notice of Allowance dated May 3, 2018, all pages.
U.S. Appl. No. 14/986,496, filed Dec. 31, 2015, Notice of Allowance dated May 18, 2018, all pages.
U.S. Appl. No. 15/246,259, filed Aug. 24, 2016 Non-Final Rejection dated May 30, 2018, all pages.
U.S. Appl. No. 15/672,997, filed Aug. 9, 2017 Non-Final Office Action dated May 15, 2018, all pages.
U.S. Appl. No. 15/230,155, filed Aug. 5, 2016, Non-Final Office Action dated May 16, 2018, all pages.

* cited by examiner

PERSONALIZED HOME AUTOMATION CONTROL BASED ON INDIVIDUALIZED PROFILING

BACKGROUND

The present disclosure relates in general to home automation, and, more specifically, but not by way of limitation, to personalized home automation control based on individualized profiling.

Many home devices and user interactions with such devices have remained unchanged for decades. However, as value, use, and demand corresponding to home automation continue to increase, consumers have come to expect more flexible and useful features. Companies are expected to compete to provide greater and greater levels of accuracy and more tailored service offerings. One of the challenges in the home automation space includes how to provide home automation that is useful and desirable to particular individuals.

There is a need in the home automation space to provide personalized and greater quality of home automation features. This and other needs are addressed by the present disclosure.

BRIEF SUMMARY

The present disclosure relates in general to home automation, and, more specifically, but not by way of limitation, to personalized home automation control based on individualized profiling.

In one aspect, a method for personalized home automation control based at least in part on individualized protocol is disclosed. A control system may perform any one or combination of the following. First sensor data may be received from a set of one or more sensors in operative communication with the control system. The first sensor data may be indicative of an identified individual that is sensed by the set of one or more sensors. A particularized pattern of activity attributed to the identified individual may be determined based at least in part on analyzing the first sensor data to correlate detected actions of the identified individual with corresponding locations, corresponding times, and corresponding device operations. Second sensor data may be received from at least one sensor of the set of one or more sensors. The sensor data may be indicative of an unidentified individual that is sensed by the at least one sensor. A set of one or more identification rules specified by a protocol record stored by the control system may be accessed. The set of one or more identification rules may include criteria for identifying sensed individuals. The second sensor data and/or identification information from another data source may be analyzed to identify the unidentified individual as corresponding to the identified individual based at least in part on the criteria for identifying sensed individuals. Responsive to identifying the unidentified individual as corresponding to the identified individual, a home automation rule may be determined based at least in part on i) the second sensor data, ii) a first location of the identified individual, and iii) the particularized pattern attributed to the identified individual. The home automation rule may include an anticipation of an operational setting of a home automation device based at least in part on movement of the identified individual and the particularized pattern. The home automation device may be instructed based at least in part on the determined home automation rule via a home automation network.

In another aspect, system for personalized home automation control based at least in part on individualized protocol is disclosed. One or more control devices may be configured to communicatively couple to a set of one or more audio sensors. The one or more control devices may include one or more processors and a memory communicatively coupled with and readable by the one or more processors and having stored therein processor-readable instructions which, when executed by the one or more processors, cause the one or more control devices to perform any one or combination of the following. First sensor data may be received from a set of one or more sensors in operative communication with the control system. The first sensor data may be indicative of an identified individual that is sensed by the set of one or more sensors. A particularized pattern of activity attributed to the identified individual may be determined based at least in part on analyzing the first sensor data to correlate detected actions of the identified individual with corresponding locations, corresponding times, and corresponding device operations. Second sensor data may be received from at least one sensor of the set of one or more sensors. The sensor data may be indicative of an unidentified individual that is sensed by the at least one sensor. A set of one or more identification rules specified by a stored protocol record may be accessed. The set of one or more identification rules may include criteria for identifying sensed individuals. The second sensor data and/or identification information from another data source may be analyzed to identify the unidentified individual as corresponding to the identified individual based at least in part on the criteria for identifying sensed individuals. Responsive to identifying the unidentified individual as corresponding to the identified individual, a home automation rule may be determined based at least in part on i) the second sensor data, ii) a first location of the identified individual, and iii) the particularized pattern attributed to the identified individual. The home automation rule may include an anticipation of an operational setting of a home automation device based at least in part on movement of the identified individual and the particularized pattern. The home automation device may be instructed based at least in part on the determined home automation rule via a home automation network.

In yet another aspect, disclosed is one or more non-transitory, machine-readable media having machine-readable instructions thereon which, when executed by one or more processing devices, facilitates personalized home automation control based at least in part on individualized protocol, causing the one or more processing devices to perform any one or combination of the following. First sensor data may be received from a set of one or more sensors in operative communication with the control system. The first sensor data may be indicative of an identified individual that is sensed by the set of one or more sensors. A particularized pattern of activity attributed to the identified individual may be determined based at least in part on analyzing the first sensor data to correlate detected actions of the identified individual with corresponding locations, corresponding times, and corresponding device operations. Second sensor data may be received from at least one sensor of the set of one or more sensors. The sensor data may be indicative of an unidentified individual that is sensed by the at least one sensor. A set of one or more identification rules specified by a stored protocol record may be accessed. The set of one or more identification rules may include criteria for identifying sensed individuals. The second sensor data and/or identification information from another data source may be analyzed to identify the unidentified individual as corresponding to the identified individual based at least in part on the criteria for identifying sensed individuals. Responsive to identifying the unidentified individual as corresponding to the identified individual, a home automation rule may be determined based at least in part on i) the second sensor data, ii) a first location of the identified individual, and iii) the particularized pattern attributed to the identified individual. The home automation rule may include an anticipation of an operational setting of a home automation device based at least in part on movement of the identified individual and the particularized pattern. The home automation device may be instructed based at least in part on the determined home automation rule via a home automation network.

In various embodiments, the home automation device may be in the first location, and the anticipation of the operational setting may be based at least in part on the movement of the identified individual being directed away from the first location. In various embodiments, the home automation device may be in a second location, and the anticipation of the operational setting may be based at least in part on the movement of the identified individual being directed toward the second location.

In various embodiments, a characterization of the unidentified individual may be generated based at least in part on i) the second sensor data and ii) the criteria for identifying sensed individuals. Consequent to the characterization of the individual corresponding to an insufficient identification, third sensor data and/or the identification information from another data source may be analyzed to identify the unidentified individual as corresponding to the identified individual based at least in part on the criteria for identifying sensed individuals. In various embodiments, the receiving first sensor data from the set of one or more sensors in operative communication with the control system may include monitoring one or more authenticated devices utilizing an application programming interface that recognizes the one or more authenticated devices and facilitates data collection from the one or more authenticated devices.

In various embodiments, a characterization of the unidentified individual may be generated based at least in part on i) the second sensor data and ii) the criteria for identifying sensed individuals. Consequent to the characterization of the individual corresponding to an insufficient identification, one or more notifications may be transmitted to one or more authenticated devices and/or registered accounts, the notifications indicative of the insufficient identification. One or more user selections corresponding to one or more user-selection options may be processed, the one or more user selections responsive to the one or more notifications. The identifying the unidentified individual as corresponding to the identified individual may be based at least in part on the one or more user selections.

In various embodiments, the determining the particularized pattern of activity attributed to the identified individual may include any one or combination of the following. A first subset of the first sensor data may be received from at least one sensor of the set of one or more sensors. Based at least in part on the first subset of the first sensor data, a first movement of the identified individual with respect to a reference location during a first time period may be identified. A first operational state change of the home automation device, within the first time period caused by the identified individual, consequent to the first movement may be identified. The first movement of the identified individual with respect to a reference location may be correlated to the first operational state change of the home automation device. A second subset of the first sensor data may be received from at least one sensor of the set of one or more sensors. Based at least in part on the second subset of the first sensor data, a second movement of the identified individual with respect to the reference location during a second time period may be identified. A second operational state change of the home automation device caused by the identified individual, within the second time period, consequent to the second movement may be identified. The second movement of the identified individual with respect to the reference location may be correlated to the second operational state change of the home automation device. The first movement, the first time period, and the first operational state change of the home automation device may be determined match the second movement, the second time period, and the second operational state change of the home automation device based at least in part on a matching threshold being satisfied. Consequent to the determined match, the home automation rule may be derived, where the home automation rule includes associating a trigger for the operational setting of the home automation device with movement criteria and time criteria corresponding to the first movement, the first time period, the first operational state change of the home automation device, the second time period, and the second operational state change of the home automation device.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. When only the first reference label is used in the specification, the description is applicable to any one of the similar components having the same first reference label irrespective of the second reference label.

DETAILED DESCRIPTION

Figure 1:
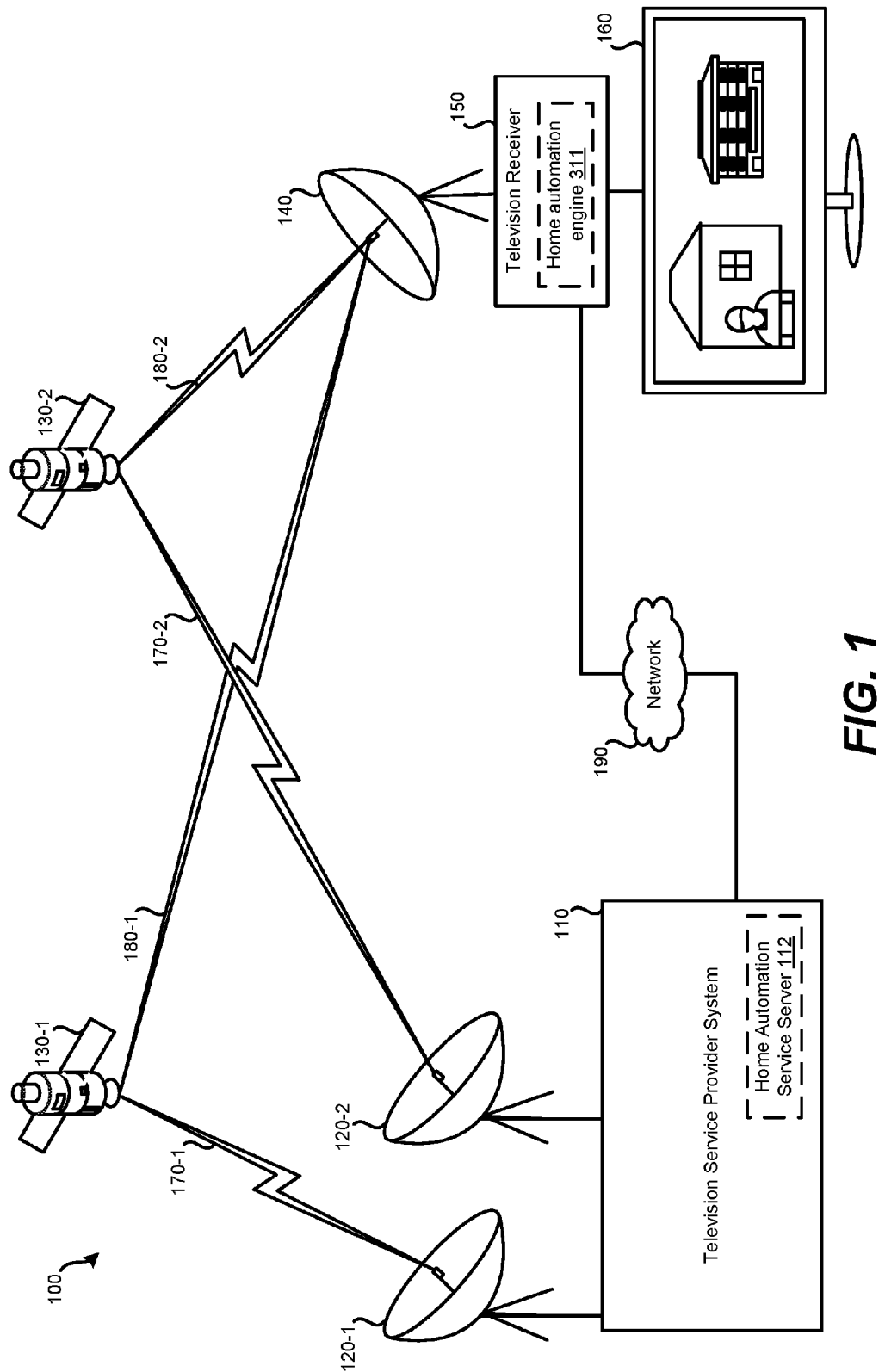
FIG. 1 illustrates an embodiment of a satellite television distribution system, in accordance with certain embodiments of the present disclosure.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the disclosure as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

The present disclosure is directed to systems, methods, apparatus, and processor-readable media for facilitating personalized home automation control based on individualized profiling. Certain embodiments according to the present disclosure may provide for personalized home automation with which it is easy to interact, that is easy to teach, and that is easy to control. Certain embodiments provide solutions to the challenges of providing home automation features to particular individuals, where those features are based on more than the mere detection of a presence of an individual in a home. Going further, embodiments provide for home automation intelligence that takes into account a variety of factors to provide for personalized home automation features. Certain embodiments may provide for a protocol order that includes presence detection and discernment features, security features, and human pattern recognition and discernment features. Certain embodiments may be able to detect the presence of multiple individuals and discern the numbers and the types of individuals detected. Certain embodiments may be able to differentiate known individuals (who may be uniquely identified and differentiated) and unknown individuals. By way of example without limitation, the types of individuals differentiated by the system may include different adults, elderly adults, small children, teenagers, mobility-restricted individuals (e.g., wheelchair users), pets, consistent occupants, periodic occupants, occasional occupants, unauthenticated guests, authenticated guests, intruders, service people, and/or the like. Having uniquely identified occupants of the home, certain embodiments may determine patterns of activity particularized to identified individuals and anticipate the home automation needs of the identified individuals based at least in part on the particularized patterns of activity. Furthermore, certain embodiments may provide for a system that is very dynamic, allowing a primary user to indicate the identity of someone who may have once been authorized but now is unwelcome (e.g., bad roommates, restraining orders, etc.)

In certain embodiments according to the present disclosure, a television receiver may serve as a host for a home automation system. By using a television receiver to host a home automation system, various advantages may be realized. For instance, the home automation system may be able to conveniently present home automation information to a user via a connected display device, such as a television or other connected devices, such as a tablet computer, mobile phone, monitor, laptop computer or wearable computing/communication devices (e.g., smartwatches, smartglasses, wearable fitness, health, and/or lifestyle monitors, and/or the like). Further, since many people spend a considerable amount of time watching television, a television may be a convenient device via which to present home automation information to a user while the user is watching television. Further, a television receiver may be able to communicate with a television service provider.

However, in various embodiments according to the present disclosure, a television receiver may not serve as a host for a home automation system. Other devices and systems may serve as a host for a home automation system, such as a computing device, a standalone system controller device, a system controller device integrated with another device, such as a security system control device, etc.

Various embodiments will now be discussed in greater detail with reference to the accompanying figures, beginning with FIG. 1.

FIG. 1 illustrates an embodiment of a satellite television distribution system 100, in accordance with certain embodiments of the present disclosure. While a home automation system may be incorporated with various types of television receivers, various embodiments may be a part of a satellite-based television distribution system. Cable, IP-based, wireless and broadcast focused systems are also possible. However, while embodiments utilizing a satellite-based television distribution system are described herein, it should be understood that certain embodiments may not utilize such a system, and, as discussed further herein, other devices and systems may serve as a host for a home automation system, such as a computing device, a standalone system controller device, a system controller device integrated with another device, such as a security system control device, etc.

Referring to FIG. 1, satellite television distribution system 100 may include: television service provider system 110, satellite transmitter equipment 120, satellites 130, satellite dish 140, television receiver 150, home automation service server 112, and display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions of) instances and types of user equipment may receive data and television signals from television service provider system 110 via satellites 130.

Television service provider system 110 and satellite transmitter equipment 120 may be operated by a television service provider. A television service provider may distribute television channels, on-demand programming, programming information, and/or other content/services to users. Television service provider system 110 may receive feeds of one or more television channels and content from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from downlink signals 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed. Further, information used by television receiver 150 for home automation functions may also be relayed to television receiver via one or more transponder streams. For instance, home automation functions may be requested by and/or pushed to the television receiver 150 from the television service provider system 110.

As shown in FIG. 1, multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 130-1. A third, fourth, and fifth television channel may be relayed via a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Further, it is contemplated that multiple home automation functions may be transmitted in similar fashion.

Satellite dish 140 may be a piece of user equipment that is used to receive transponder streams from one or more satellites, such as satellites 130. Satellite dish 140 may be provided to a subscriber for use on a subscription basis to receive television channels and/or home automation functions provided by the television service provider system 110 and/or specifically, the home automation service server 112 of the provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time. Merely by way of example, multiple television channels and/or multiple home automation functions may be received concurrently.

Figure 2:
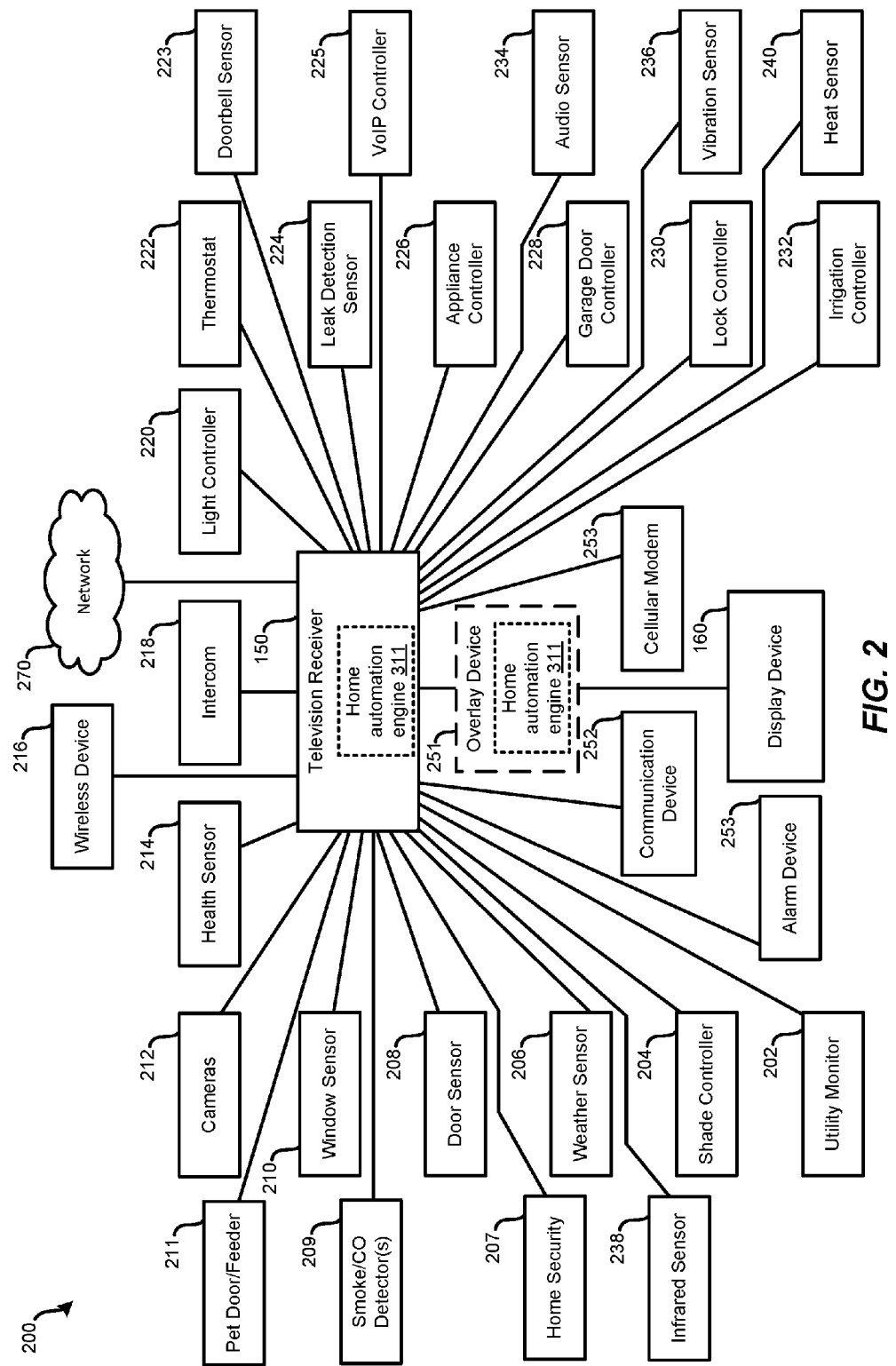
FIG. 2 illustrates an embodiment of a home automation system hosted by a television receiver and/or an overlay device, in accordance with certain embodiments of the present disclosure.

FIG. 1 further illustrates one or more television receivers in communication with satellite dish 140. Television receivers may be configured to decode signals received from satellites 130 via satellite dish 140 for output and presentation via a display device, such as display device 160. Similarly, such television receivers may decode signals received for any home automation devices. For instance, a home automation engine 311, as described further below, may decode such signals. A television receiver may be incorporated as part of a television or may be part of a separate device, commonly referred to as a set-top box (STB). Television receiver 150 may decode signals received via satellite dish 140 and provide an output to display device 160. On-demand content, such as PPV content, may be stored to a computer-readable storage medium. FIG. 2 described below provides additional detail of various embodiments of a television receiver. A television receiver is defined to include set-top boxes (STBs) and also circuitry having similar functionality that may be incorporated with another device. For instance, circuitry similar to that of a television receiver may be incorporated as part of a television. As such, while FIG. 1 illustrates an embodiment of television receiver 150 as separate from display device 160, it should be understood that, in other embodiments, similar functions may be performed by a television receiver integrated with display device 160. In some embodiments, television receiver 150 may include the home automation engine 311, as detailed in relation to FIG. 3. In some embodiments, the home automation engine 311 may be included in another device, such as a computing device, a standalone system controller device, a system controller device integrated with another device, such as a security system control device, etc.

Referring again to FIG. 1, display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

As further illustrated in FIG. 1, uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels and/or home automation functions. For example, uplink signal 170-1 may contain a first group of television channels and/or home automation functions, while uplink signal 170-2 contains a second group of television channels and/or home automation functions. Each of these television channels and/or home automation functions may be scrambled such that unauthorized persons are prevented from accessing the television channels.

Downlink signal 180-1 represents a signal between satellite 130-1 and satellite dish 140. Downlink signal 180-2 represents a signal between satellite 130-2 and satellite dish 140. Each of the downlink signals 180 may contain one or more different television channels and/or home automation functions, which may be at least partially scrambled. A downlink signal may be in the form of a transponder stream. A single transponder stream may be tuned to at a given time by a tuner of a television receiver. For example, downlink signal 180-1 may be a first transponder stream containing a first group of television channels and/or home automation functions, while downlink signal 180-2 may be a second transponder stream containing a different group of television channels and/or home automation functions. In addition to or instead of containing television channels, a transponder stream can be used to transmit on-demand content to television receivers, including PPV content (which may be stored locally by the television receiver until output for presentation).

FIG. 1 further illustrates downlink signal 180-1 and downlink signal 180-2, being received by satellite dish 140 and distributed to television receiver 150. For a first group of television channels and/or home automation functions, satellite dish 140 may receive downlink signal 180-1 and for a second group of channels and/or home automation functions, downlink signal 180-2 may be received. Television receiver 150 may decode the received transponder streams. As such, depending on which television channels and/or home automation functions are desired to be presented or stored, various transponder streams from various satellites may be received, descrambled, and decoded by television receiver 150.

Further shown in FIG. 1, network 190, which may include the Internet, may allow for bidirectional communication between television receiver 150 and television service provider system 110, such as for home automation related services provided by home automation service server 112. In addition or in alternate to network 190, a telephone (e.g., landline) or cellular connection may be used to enable communication between television receiver 150 and television service provider system 110.

FIG. 2 illustrates an embodiment of a home automation system 200 hosted by a television receiver 150 and/or an overlay device 251, in accordance with certain embodiments of the present disclosure. Television receiver 150 may represent the television receiver of FIG. 1. While television receiver 150 may be configured to receive television programming from a satellite-based television service provider, it should be understood that in other embodiments, other forms of television service provider networks may be used, such as an IP-based network (e.g., fiber network), a cable based network, a wireless broadcast-based network, etc.

Television receiver 150 may be configured to communicate with multiple in-home home automation devices. The devices with which television receiver 150 communicates may use different communication standards or protocols. Sensors and control units may be coupled and connected in a serial, parallel, star, hierarchical, and/or the like topologies and may communicate to the television receiver 150 via one or more serial, bus, or wireless protocols and technologies which may include, for example, WiFi, CAN bus, Bluetooth, I2C bus, ZigBee, Z-Wave and/or the like. For instance, one or more devices may use a ZigBee® communication protocol while one or more other devices communicate with the television receiver using a Z-Wave® communication protocol. Other forms of wireless communication may be used by devices and the television receiver 150. For instance, television receiver 150 and one or more devices may be configured to communicate using a wireless local area network, which may use a communication protocol such as 802.11.

In some embodiments, a separate device may be connected with television receiver 150 to enable communication with home automation devices. For instance, communication device 252 may be attached to television receiver 150. Communication device 252 may be in the form of a dongle. Communication device 252 may be configured to allow for ZigBee®, Z-Wave®, and/or other forms of wireless communication.

The communication device may connect with television receiver 150 via a USB port or via some other type of (wired) communication port. Communication device 252 may be powered by the television receiver 150 or may be separately coupled with a power source. In some embodiments, television receiver 150 may be enabled to communicate with a local wireless network and may use communication device 252 in order to communicate with devices that use a ZigBee® communication protocol, Z-Wave® communication protocol, and/or some other home wireless communication protocols.

Communication device 252 may also serve to allow additional components to be connected with television receiver 150. For instance, communication device 252 may include additional audio/video inputs (e.g., HDMI), component, and/or composite input to allow for additional devices (e.g., Blu-ray players) to be connected with television receiver 150. Such connection may allow video from such additional devices to be overlaid with home automation information. Merely by way of example, whether home automation information is overlaid onto video may be triggered based on a user's press of a remote control button.

As shown in FIG. 2, regardless of whether television receiver 150 uses communication device 252 to communicate with home automation devices, television receiver 150 may be configured to output home automation information for presentation to a user via display device 160. Such information may be presented simultaneously with television programming received by television receiver 150, such as via system 100 of FIG. 1. Television receiver 150 may also, at a given time, output only television programming or only home automation information based on a user's preference. The user may be able to provide input to television receiver 150 to control the home automation system hosted by television receiver 150 or by overlay device 251, as detailed below.

In some embodiments, television receiver 150 may not be used as a host for a home automation system. Rather, a separate device may be coupled with television receiver 150 that allows for home automation information to be presented to a user via display device 160. This separate device may be coupled with television receiver 150. In some embodiments, the separate device is referred to as overlay device 251. Overlay device 251 may be configured to overlay information, such as home automation information, onto a signal to be visually presented via display device 160, such as a television. In some embodiments, overlay device 251 may be coupled between television receiver 150, which may be in the form of a set top box, and display device 160, which may be a television. In such embodiments, television receiver 150 may receive, decode, descramble, decrypt, store, and/or output television programming and/or home automation functions. Television receiver 150 may output a signal, such as in the form of an HDMI signal. In some embodiments, rather than be directly input to display device 160, the output of television receiver 150 may be input to overlay device 251. Overlay device 251 may receive the video and/or audio output from television receiver 150. Overlay device 251 may add additional information to the video, audio and/or home automation function signal received from television receiver 150. The modified video and/or audio signal may be output to display device 160 for presentation. In some embodiments, overlay device 251 has an HDMI input and an HDMI output, with the HDMI output being connected to display device 160. To be clear, while FIG. 2 illustrates lines illustrating communication between television receiver 150 and various devices, it should be understood that such communication may exist, in addition or in alternate via communication device 252 and/or with overlay device 251.

In various embodiments, television receiver 150, communication device 252, and/or overlay device 251 may be or include a tablet computer, cellular phone, smartphone, laptop computer, remote computer, and/or some other device through which a user may desire to control home automation settings and view home automation information. In some embodiments, television receiver 150 may be used to provide home automation functionality while overlay device 251 may be used to present information via display device 160. It should be understood that the home automation functionality detailed herein in relation to a television receiver may alternatively be provided via overlay device 251. In some embodiments, overlay device 251 may provide home automation functionality and be used to present information via display device 160. Using overlay device 251 to present automation information via display device 160 may have additional benefits. For instance, multiple devices may provide input video to overlay device 251. For instance, television receiver 150 may provide television programming to overlay device 251, a DVD/Blu-ray player may provide video to overlay device 251, and a separate internet-TV device may stream other programming to overlay device 251. Regardless of the source of the video/audio, overlay device 251 may output video and/or audio that has been modified to include home automation information, such as a pop-up overlay with a prompt message, and output to display device 160. As such, in such embodiments, regardless of the source of video/audio, overlay device 251 may modify the audio/video to include home automation information and, possibly, solicit for user input. For instance, in some embodiments overlay device 251 may have four video inputs (e.g., four HDMI inputs) and a single video output (e.g., an HDMI output). In other embodiments, such overlay functionality may be part of television receiver 150. As such, a separate device, such as a Blu-ray player may be connected with a video input of television receiver 150, thus allowing television receiver 150 to overlay home automation information when content from the Blu-ray player is being output to display device 160.

Regardless of whether television receiver 150 is itself configured to provide home automation functionality and output home automation input for display via display device 160 or such home automation functionality is provided via overlay device 251, home automation information may be presented by display device 160 while television programming is also being presented by display device 160. For instance, home automation information may be overlaid or may replace a portion of television programming (e.g., broadcast content, stored content, on-demand content, etc.) presented via display device 160. Merely by way of example, while television programming is being presented (e.g., a television show on scuba diving), the display is augmented with information related to home automation. This television show may represent broadcast programming, recorded content, on-demand content, or some other form of content. In one example, the presented home automation information is related to motion being detected by a camera at a front door of a location. Such augmentation of the television programming may be performed directly by television receiver 150 (which may or may not be in communication with communication device 252) or overlay device 251 connected with television receiver 150 and display device 160. Such augmentation may result in solid or partially transparent graphics being overlaid onto television programming (or other forms of video) output by television receiver 150. Overlay device 251 or television receiver 150 may be configured to add or modify sound to television programming. In addition or in alternate, a graphic may be displayed. In other embodiments, camera data (e.g., nanny camera data and/or software facilitating determining the number of individuals on the premises) and/or associated sound or motion sensors may be integrated in the system and overlaid or otherwise made available to a user.

Such presented home automation information may request user input. For instance, a user, via controls of television receiver 150 (e.g., a remote control) or controls of overlay device 251, can specify whether video from a camera at the front door should be presented, not presented, or if future notifications related to such motion such be ignored. If ignored, this may be for a predefined period of time, such as an hour, or until the television receiver 150 or overlay device 251 is powered down and powered back on. Ignoring of video may be particularly useful if motion or some other event is triggering the presentation of video that is not interesting to a viewer of display device 160 (or a wireless device).

Television receiver 150 or overlay device 251 may be configured to communicate with one or more wireless devices, such as wireless device 216. Wireless device 216 may represent a tablet computer, cellular phone, smartphone, laptop computer, remote computer, or some other device through which a user may desire to control home automation settings and view home automation information. Such a device also need not be wireless, such as a desktop computer. Television receiver 150, communication device 252, or overlay device 251 may communicate directly with wireless device 216, or may use a local wireless network, such as network 270. Wireless device 216 may be remotely located and not connected with a same local wireless network. Via the internet, television receiver 150 or overlay device 251 may be configured to transmit a notification to wireless device 216 regarding home automation information. For instance, in some embodiments, a third-party notification server system, such as the notification server system operated by Apple®, may be used to send such notifications to wireless device 216. Notifications may include any suitable information to allow for system management, such as status, image data, audio and/or video data, configuration data, and/or the like. An application may be provided directly or indirectly by service provider for installation and execution by the wireless device 216 to allow for invoking, waking up, opening, and/or otherwise activating the application responsive to notifications, presentation of notifications, provisioning of a user interface to allow for output of information to a user and for input from user with one or more user-selectable options. In various embodiments, an end-user interface may include providing one or more display screens that may each include one or more user interface elements. An end-user interface may include any text, image, and/or device that can be displayed on a display screen for providing information to a user and/or for receiving user input. An end-user interface may include one or more icons, widgets, buttons, checkboxes, text, text boxes, text fields, tables, lists, and/or the like.

Further shown in FIG. 2, in some embodiments, a location of wireless device 216 may be monitored. For instance, if wireless device 216 is a cellular phone, when its position indicates it has neared a door, the door may be unlocked. A user may be able to define which home automation functions are controlled based on a position of wireless device 216. Other functions could include opening and/or closing a garage door, adjusting temperature settings, turning on and/or off lights, opening and/or closing shades, etc. Such location-based control may also take into account the detection of motion via one or more motion sensors that are integrated into other home automation devices and/or stand-alone motion sensors in communication with television receiver 150.

In some embodiments, little to no setup of network 270 may be necessary to permit television receiver 150 to stream data out to the Internet. For instance, television receiver 150 and network 270 may be configured, via a service such as Sling® or other video streaming service, to allow for video to be streamed from television receiver 150 to devices accessible via the Internet. Such streaming capabilities may be "piggybacked" to allow for home automation data to be streamed to devices accessible via the Internet. For example, U.S. patent application Ser. No. 12/645,870, filed on Dec. 23, 2009, entitled "Systems and Methods for Remotely Controlling a Media Server via a Network", which is hereby incorporated by reference, describes one such system for allowing remote access and control of a local device. U.S. Pat. No. 8,171,148, filed Apr. 17, 2009, entitled "Systems and Methods for Establishing Connections Between Devices Communicating Over a Network", which is hereby incorporated by reference, describes a system for establishing connection between devices over a network. U.S. patent application Ser. No. 12/619,192, filed May 19, 2011, entitled "Systems and Methods for Delivering Messages Over a Network", which is hereby incorporated by reference, describes a message server that provides messages to clients located behind a firewall.

Still referring to FIG. 2, as an example of how wireless device 216 may be used in conjunction with television receiver 150 or overlay device 251 for controlling a home automation system, a wireless device 216 may be in communication with television receiver 150 serving as the host of a home automation system. At approximately a same time that the home automation information is presented via display device 160 (assuming it is already turned on or, in some embodiments, activated via a system controller transmission), similar information may be sent to wireless device 216, such as via a third-party notification server or directly from television receiver 150 or overlay device 251 via a local wireless network. With a notification with information about a condition governed by a home automation rule (e.g., a detected presence of an insufficiently identified/authorized individual), one or more user-selectable options may be provided to allow a user of wireless device 216 to specify how the condition should be handled (e.g., the user may authorize/confirm the presence of the detected individual), or if future notifications related to such detection such be ignored. If ignored, this may be for a predefined period of time, such as an hour or some other predefined or user-selected period of time. In this way, a user interface of the wireless device 216 may correspond to an overlay of the home automation information and/or prompt appearing on the display device 160. In some embodiments, the notification may only be provided via the wireless device 216 and not the display device 160. In some embodiments, the notification may be provided via the wireless device 216 only if the display device 160 is not in a display mode. In some embodiments, the notification may be provided via the wireless device 216 if a response is not received responsive to a notification sent to the display device 160 after a threshold amount of time (e.g., to address instances where there are no viewers currently in the room or where a viewer has fallen asleep). Accordingly, various embodiments may provide a notification escalation scheme.

Wireless device 216 may serve as an input device for television receiver 150. For instance, wireless device 216 may be a tablet computer that allows text to be typed by a user and provided to television receiver 150. Such an arrangement may be useful for text messaging, group chat sessions, or any other form of text-based communication. Other types of input may be received for the television receiver from a tablet computer or other device, such as lighting commands, security alarm settings and door lock commands. While wireless device 216 may be used as the input device for typing text, television receiver 150 may output for display text to display device 160.

Wireless device 216 may be configured to store a software model of home automation system intended to mirror the software model stored by television receiver 150, which is hosting the home automation system. For instance, such a software model may allow wireless device 216 to view, communicate with, and/or interact with various home automation devices. Such a software model may indicate the state of various home automation devices. When wireless device 216 is not in communication with television receiver 150, changes to the home automation model made at television receiver 150 may not be known to wireless device 216. A history list maintained by television receiver 150 and/or a synchronization point numerical value, whereby each change to the home automation model by television receiver 150 is assigned a value and synchronized at a later point with the wireless device 216, may be implemented. In another aspect, the wireless device 216 may be utilized by a user for entering and/or confirming rules and other settings of the home automation system, and such settings may be synchronized or otherwise communicated with the television receiver 150.

In some embodiments, a cellular modem 253 may be connected with either overlay device 251 or television receiver 150. Cellular modem 253 may be useful if a local wireless network is not available. For instance, cellular modem 253 may permit access to the internet and/or communication with a television service provider. Communication with a television service provider, such as television service provider system 110 of FIG. 1, may also occur via a local wireless or wired network connected with the Internet. In some embodiments, information for home automation purposes may be transmitted by television service provider system 110 to television receiver 150 or overlay device 251 via the television service provider's distribution network, which may include the use of satellites 130.

Various home automation devices may be in communication with television receiver 150 or overlay device 251. Such home automation devices may use disparate communication protocols. Such home automation devices may communicate with television receiver 150 directly or via communication device 252. Such home automation devices may be controlled by a user and/or have a status viewed by a user via display device 160 and/or wireless device 216. Such home automation device may include one or more of the following, as discussed below.

As shown in FIG. 2, such home automation devices may include one or more cameras, such as camera 212. In some embodiments, camera(s) 212 may include one or more infrared cameras. The camera(s) 212 may, in some embodiments, include infrared sensors 238. Camera 212 may be either indoors or outdoors and may provide a video and, possibly, audio stream which can be presented via wireless device 216 and/or display device 160. Video and/or audio from camera 212 may be recorded by overlay device 251 or television receiver 150 upon an event occurring, such as motion being detected by camera 212. Video and/or audio from camera 212 may be continuously recorded such as in the form of a rolling window, thus allowing a period of time of video/audio to be reviewed by a user from before a triggering event and after the triggering event. Video may be recorded on a storage local to overlay device 251 or television receiver 150, or may be recorded and or storage on external storage devices, such as a network attached storage device. In some embodiments, video may be transmitted across the local and/or wide area network to other storage devices upon occurrence of a trigger event for later playback. For initial setup, a still from camera 212 may be captured by and stored by television receiver 150 for subsequent presentation as part of a user interface via display device 160 such that the user can determine which camera (if multiple cameras are present) is being set up and/or later accessed.

For instance, as shown in FIG. 2, video and, possibly, audio from camera 212 may be available live for viewing by a user via overlay device 251 or television receiver 150. Such video may be presented simultaneously with television programming being presented. In some embodiments, video may only be presented if motion is detected by camera 212, otherwise video from camera 212 may not be presented by the display device presenting television programming. Also, such video (and, possibly, audio) from camera 212 may be recorded by television receiver 150 or overlay device 251. Such video may be recorded based upon a timer configured by a user. For instance, camera 212 may be incorporated into an electronic programming guide (EPG) output for display by television receiver 150. For instance, camera 212 may be presented as a "channel" as part of the EPG along with other television programming channels. A user may be permitted to select the channel associated with camera 212 for presentation via display device 160 (or wireless device 216). The user may also be permitted to set a timer to record the channel of camera 212 for a user-defined period of time on a user-defined date. Such recording may not be constrained by the rolling window associated with a triggering event being detected. In some embodiments, video from camera 212 may be backed up to a remote storage device, such as cloud-based storage hosted by home automation service server 112. Other data may also be cached to the cloud, such as configuration settings. Thus, if the television receiver 150 or overlay device 251 malfunctions, then a new device may be installed and the configuration data loaded onto the device from the cloud.

Further shown in FIG. 2, window sensor 210 and door sensor 208 may transmit data to television receiver 150 (possibly via communication device 252) or overlay device 251 that indicates the status of a window or door, respectively. Such status may indicate open or closed. When a status change occurs, the user may be notified as such via wireless device 216 or display device 160. Further, a user may be able to view a status screen to view the status on one or more window sensors and/or one or more door sensors throughout the location. Window sensor 210 and/or door sensor 208 may have integrated glass break sensors to determine if glass has been broken.

In some embodiments, window sensor 210 and/or door sensor 208 may include one or more weight-sensing mats. Weight-sensing mats could be both inside and outside the door to be able to determine if someone just left or entered, or just answered the door. The weight-sensing mats may allow the system to determine mass and/or weight of an individual to better identify the exact owner of the system, as well as authorized visitors and intruders. Certain embodiments of the weight-sensing mat may include sectional discrimination so that weight on one foot versus another could indicate health issues, trauma, increasing trend, etc. So, for example, if a weight-sensing mat is placed at the sink for when brushing teeth, over time it might be noticed that more and more weight is being put on the right leg every day over two months. Such indicia may not be noticeable unless tracked over time. Accordingly, data from the weight-sensing mats may be captured the system and used in the individual identification processes disclosed herein.

Further, some embodiments may provide for a bed sensor configured to detect if someone is in bed. Such a sensor may also check for potential issues or pattern changes by how weight is distributed on the bed, and may detect and discern weight distributions of one or more people on the bed.

One or more smoke and/or CO (carbon monoxide) detectors 209 may be integrated as part of a home automation system. The smoke and/or CO (carbon monoxide) detectors 209 may be used inside a home, as well as outside the home in areas such as garages. As such, alerts as to whether a fire or CO has been detected can be sent to television receiver 150, wireless device 216, and/or emergency first responders. Further, television receiver 150 and/or wireless device 216 may be used to disable false alarms. One or more sensors may be integrated or separate to detect gas leaks, radon, or various other dangerous situations.

Pet door and/or feeder 211 may allow for pet related functionality to be integrated with television receiver 150. For instance, a predefined amount of food may be dispensed at predefined times to a pet. A pet door may be locked and/or unlocked. The pet's weight or presence may trigger the locking or unlocking of the pet door. For instance, a camera located at the pet door may be used to perform image recognition of the pet or a weight sensor near the door may identify the presence of the pet and unlock the door. A user may also lock/unlock a pet door via television receiver 150 and/or wireless device 216.

Weather sensor 206 may allow television receiver 150 or overlay device 251 to receive, identify, and/or output various forms of environmental data, including temperature, humidity, wind speed, barometric pressure, etc. Television receiver 150 or overlay device 251 may allow for control of one or more shades, such as window, door, and/or skylight shades, within a house. Shade controller 204 may respond to commands from television receiver 150 or overlay device 251 and may provide status updates (e.g., shade up, shade 50% up, shade down, etc.).

In some embodiments, television receiver 150 may receive and notify a user of the status of electrical appliances such as refrigerators and dishwashers within the house. The television receiver 150 may be linked to the appliances and present a notification message to the user through any device that the user is using at the time, such as a tablet computer, mobile phone or thin client. U.S. patent application Ser. No. 12/700,310, filed Feb. 4, 2010, entitled "Electronic Appliance Status Notification via a Home Entertainment System", which is hereby incorporated by reference, describes such techniques in further detail.

Also shown in FIG. 2, utility monitor 202 may serve to provide television receiver 150 or overlay device 251 with utility information, such as electricity usage, gas usage, water usage, wastewater usage, irrigation usage, etc. A user may view a status page or may receive notifications upon predefined events occurring, such as electricity usage exceeding a defined threshold within a month, or current kilowatt usage exceeding a threshold.

FIG. 2 further shows a health sensor 214 that may permit a user's vital characteristics to be monitored, such as a heart rate, respiration, blood pressure, etc. Data from the health sensor 214 may be captured the system and used in the individual identification processes disclosed herein. In the normal operating mode, the devices may aid in establishing the identity of the occupant. The system may use the data to establish a baseline, and detect deviations that might trigger alarms when an individual (say, one wearing health sensor 214) has biometrics that do not match that of an authenticated user.

In some embodiments, health sensor 214 may correspond to a wearable computing and/or communication device that is configured to be a fitness, health, and/or lifestyle monitor. In some embodiments, additionally or alternatively, health sensor 214 may contain a button or other type of actuator that a user can press to request assistance. As such, health sensor 214 may be mounted to a fixed location, such as bedside, or may be carried by a user, such as on a lanyard. Such a request may trigger a notification to be presented to other users via display device 160 and/or wireless device 216. Additionally or if the notification is not cleared by another user within a predefined period of time, a notification may be transmitted to emergency first responders to request help. In some embodiments, a home automation service provider may first try contacting the user, such as via phone, to determine if an emergency is indeed occurring. Such a health sensor 214 may have additional purposes, such as for notification of another form of emergency, such as a break-in, fire, flood, theft, disaster, etc. In some examples, the health sensor 214 may receive signals from various cameras, temperature sensors, and other monitoring equipment in connection with the home automation system, analyze such signals, and store or report such signals as necessary.

In some embodiments, health sensor 214 may be used as a medical alert pendant that can be worn or otherwise carried by a user. It may contain a microphone and/or speaker to allow communication with other users and/or emergency first responders. Television receiver 150 or overlay device 251 may be preprogrammed to contact a particular phone number (e.g., emergency service provider, relative, caregiver, etc.) based on an actuator of health sensor 214 being activated by a user. The user may be placed in contact with a person via the phone number and the microphone and/or speaker of health sensor 214. Camera data may be combined with such alerts in order to give a contacted relative more information regarding the medical situation. For example, health sensor 214, when activated in the family room, may generate a command which is linked with security camera footage from the same room. In some embodiments, health sensor 214 may be able to monitor vitals of a user, such as a blood pressure, temperature, heart rate, blood sugar, etc. In some embodiments, an event, such as a fall or exiting a structure can be detected. Further, parallel notifications may be sent by the health sensor 214 to multiple user devices at approximately the same time. As such, multiple people can be made aware of the event at approximately the same time (as opposed to serial notification). Which users are notified for which type of event may be customized by a user of television receiver 150.

In addition to such parallel notifications being based on data from health sensor 214, data from other devices may trigger such parallel notifications according to various rules within the home automation system. For instance, a mailbox open, a garage door open, an entry/exit door open during wrong time, an unauthorized control of specific lights during vacation period, a water sensor detecting a leak or flow, a temperature of room or equipment is outside of defined range, and/or motion detected at front door are examples of possible events which may trigger parallel notifications. A configuring user may be able to select whom to notify from a list of users provided by the home automation system and to select a method of notification to enable such parallel notifications. The configuring user may prioritize which systems and people are notified, and specify that the notification may continue through the list unless acknowledged either electronically or by human interaction. For example, the user could specify that they want to be notified of any light switch operation in their home during their vacation. Notification priority could be 1) SMS Message, 2) push notification, 3) electronic voice recorder places call to primary number, and 4) electronic voice recorder places call to spouse's number. The second notification may never happen if the user replies to the SMS message with an acknowledgment. Or, the second notification would automatically happen if the SMS gateway cannot be contacted.

Intercom 218 may permit a user in one location to communicate with a user in another location, who may be using wireless device 216, display device 160 or some other device, such another television receiver within the structure. Intercom 218 may be integrated with camera 212 or may use a dedicated microphone/speaker, such as a Bluetooth® microphone. Microphones/speakers of wireless device 216, display device 160, communication device 252, overlay device 251 may also or alternatively be used. A multimedia over coax (MOCA) network or other appropriate type of network may be used to provide audio and/or video based intercom via television receiver 150 with other television receivers and/or wireless devices in communication with television receiver 150. Similarly, video and/or audio conferencing can be provided, such that communication with persons via the Internet is possible. Therefore, one possible use would be video and/or audio conferencing within a structure using each television receiver (and associated connected display devices) in the structure that are in communication, or allowing each television receiver to perform video/audio conferencing with other devices external to the structure or local area network.

To enable intercom 218, a microphone may be placed in a location where a user would typically be using intercom 218. For instance, a microphone may be placed near display device 160. In some embodiments, a microphone may be integrated into a remote control of television receiver 150. As such, if a user is using television receiver 150 via remote control, the user would have access to a microphone. In at least one embodiment, a user can leverage the wireless device 216, such as a mobile phone or tablet computer, as the microphone for the home automation system.

Doorbell sensor 223 may permit an indication of when a doorbell has been rung to be sent to multiple devices, such as television receiver 150 and/or wireless device 216. In some embodiments, doorbell sensor 223 detecting a doorbell ring may trigger video to be recorded by camera 212 of the area near the doorbell and the video to be stored until deleted by a user (or stored for predefined period of time). Such a microphone, a microphone on one or more other home automation devices, or another audio sensor 234 (which may or may not be dedicated to capturing audio data for audio analysis), may allow for voice recognition to be performed. In some embodiments, voice recognition may be performed by television receiver 150. Voice recognition may allow for a particular user to be determined and for commands to be completed based on a user speaking such commands. For instance, an adult user may be permitted to perform certain functions that a child user cannot; such as unlocking doors. Each user may provide a voice sample which is used by television receiver 150 to distinguish users from each other. Further, users may be able to speak commands, such as "lower heat 5 degrees," to control home automation devices. Based on the command received, television receiver 150 may determine to which home automation device the command is intended and may transmit an appropriate command (such as, in this example, a command to lower the heat setting by five degrees to thermostat 222). In at least one embodiment, a user may use a user-defined code word that precedes or follows a command, such as "Simon says," then speaking a command such as "turn on the living room lights." Some embodiments may provide for one or more code words to indicate an emergency situation so that, say, the police are called. Thus, for example, if when the user enters or is about to enter the home, instead using a typically command (say, "hello"), the user voices the code words (say, "open sesame"), the system may be configured to recognize that an intruder is present and that the police should be alerted.

In some embodiments, in addition or in alternate to voice identification, fingerprint identification may be used to determine an identity of a user. Specific functions of television receiver 150 and/or a keyless entry device (e.g., a keyless entry device communicatively coupled with lock controller 230) may require that a user log in, such as via a fingerprint scanner, before being able to view and/or modify such functions, and/or unlock a door and/or window and enter the home. Likewise, in some embodiments, in addition or in alternative, optical identification, with, for example, a retina scanner, may be used to determine an identity of a user before the user is allowed view and/or modify functions, and/or unlock a door and/or window and enter the home. In various embodiments, one or more cameras 212, infrared sensors 238, and/or heat sensors 240 may be configured to capture image, infrared, and/or heat data indicative of occupant and/or occupant states, such as any one or combination of facial recognition, optical recognition, infrared impressions, heat impressions, gestures, other occupant movements, and/or the like. Data captured from such sensors may be in identification processes disclosed herein, in particular for recognizing baselines and deviations therefrom. In various embodiments, one or more of such sensors may be configured to detect if an oven and/or stove is on. This could be on its own as a heat sensor, or backed up by an electricity or gas flow sensor. Gas flow could be doubled for clothes driers, hot water heaters, furnaces, etc. An electricity sensor could be doubled for any electric appliance (hair dryer, hair curlers, electric shaver, tea kettle, etc.).

Some embodiments may perform image analysis of image data captured with cameras 212 and/or cameras on one or more other home automation devices to determine one or more image baselines for individuals within the home. Captured occupant image data may be correlated to reference images using any suitable facial trait qualifications for correlation. As disclosed herein, a matching engine may link particular occupant image data to user profiles with image data associated with individuals, to identify a known person or a new person. The reference image data may be refined over time as an image baseline(s) for a particular individual is developed with additional data captures. Such reference images may be used by the system to identify inconsistencies/nonconformities with respect to particularized patterns. When such inconsistencies/nonconformities satisfy one or more thresholds, certain home automation actions, such as security measures, may be caused.

Similarly, some embodiments may perform infrared analysis of infrared data captured with infrared sensors 238 to determine one or more infrared baselines for individuals within the home. Some embodiments may perform infrared analysis of heat data captured with heat sensors 240 to determine one or more heat baselines for individuals within the home. Captured occupant sourced infrared and/or heat data may be correlated to reference infrared and/or heat impressions. As disclosed herein, a matching engine may link particular occupant infrared and/or heat impressions to user profiles with infrared and/or heat impressions associated with individuals, to identify a known person or a new person. The reference infrared and/or heat impressions data may be refined over time as infrared and/or heat baseline(s) for a particular individual are developed with additional data captures. Such reference impressions may be used by the system to identify inconsistencies/nonconformities with respect to particularized patterns. When such inconsistencies/nonconformities satisfy one or more thresholds, certain home automation actions, such as security measures, may be caused.

Some embodiments may perform audio analysis of audio data captured with audio sensor 234 and/or microphones on one or more other home automation devices to determine one or more sound baselines for locations within the home. Similarly, some embodiments may perform vibrational analysis of vibration data captured with vibration sensor 236 (which may or may not be dedicated to capturing vibration data for vibrational analysis) and/or vibration sensors on one or more other home automation devices to determine one or more sound baselines for locations within the home. A sound baseline may be determined for each room of the home, for example. Variations of the baselines may be recorded for different times of day, days, weeks, months, etc. to determine audio impressions of locations within the home (which may include sounds from non-human sources, such as devices, pets, environmental conditions, etc.) and humans therein. Such audio impressions may be used by the system to identify inconsistencies/nonconformities of real-time audio detection with respect to particularized patterns. When such inconsistencies/nonconformities satisfy one or more thresholds, certain home automation actions, such as security measures, may be caused.

A vibration baseline may be determined for each room of the home, for example. Variations of the baselines may be recorded for different times of day, days, weeks, months, etc. to determine vibration impressions of locations within the home (which may include vibrations from non-human sources, such as devices, pets, environmental conditions, etc.) and humans therein. Such vibration impressions may be used by the system to identify inconsistencies/nonconformities of real-time vibration detection with respect to particularized patterns. When such inconsistencies/nonconformities satisfy one or more thresholds, certain home automation actions, such as security measures, may be caused.

Light controller 220 may permit a light to be turned on, off, and/or dimmed by television receiver 150 or overlay device 251 (such as based on a user command received via wireless device 216 or directly via television receiver 150 or overlay device 251). Light controller 220 may control a single light. As such, multiple different light controllers 220 may be present within a house. In some embodiments, a physical light switch (which opens and closes a circuit of the light) may be left in the on position such that light controller 220 can be used to control whether the light is on or off. Light control 220 may be integrated into a light bulb or into a circuit (such as between the light fixture and the power source) to control whether the light is on or off. The user, via television receiver 150 or overlay device 251 may be permitted to view a status of all light controllers 220 within a location. Since television receiver 150 or overlay device 251 may communicate using different home automation protocols, different light controllers 220 (and, more generally, different home automation devices) within a location may use disparate communication protocols, but may all still be controlled by television receiver 150 or overlay device 251. In some embodiments, wireless light switches may be used that communicate with television receiver 150 or overlay device 251. Such switches may use a different communication protocol than light controllers 220. Such a difference may not affect functionality because television receiver 150 or overlay device 251 can serve as a hub for multiple disparate communication protocols and perform any necessary translation and/or bridging functions. For example, a tablet computer may transmit a command over a WiFi connection and television receiver 150 or overlay device 251 may translate the command into an appropriate ZigBee or Z-Wave command for a wireless light bulb. In some embodiments, the translation may occur for a group of disparate devices. For example, a user decides to turn off all lights in a room and selects a lighting command on the tablet computer. The overlay device 251 identifies the lights in the room and outputs appropriate commands to all devices over different protocols, such as a ZigBee wireless lightbulb and a Z-Wave table lamp. Television receiver 150 may permit timers and/or dimmer settings to be set for lights via light controller 220. For instance, lights can be configured to turn on/off at various times during a day according to a schedule (and/or events being detected by the home automation system).

Thermostat 222 may communicate with television receiver 150 or overlay device 251. Thermostat 222 may provide heating/cooling updates on the location to television receiver 150 or overlay device 251 for display via display device 160 and/or wireless device 216. Further, control of thermostat 222 may be effectuated via television receiver 150 or overlay device 251. Zone control within a structure using multiple thermostats may also be possible.

Leak detection sensor 224 of FIG. 2 may be in communication with television receiver 150 or overlay device 251 and may be used to determine when a water leak has occurred, such as in pipes supplying water-based fixtures with water. Leak detection sensor 224 may be configured to attach to the exterior of a pipe and listen for a sound of water moving within a pipe. In other embodiments, sonar, temperature sensors or ion infused water with appropriate sensors may be used to detect moving water. In some embodiments, sensors may be positioned to detect water running (e.g., post exiting a faucet) to determine whether a sink is running properly (e.g., detecting backup, measures flow lower than an in-pipe sensor might detect, etc.).

As such, cutting or otherwise modifying plumbing may not be necessary to use leak detection sensor 224. If water movement is detected for greater than a threshold period of time, it may be determined that a leak is occurring. Leak detection sensor 224 may have a component that couples over an existing valve such that the flow of water within one or more pipes can be stopped. For instance, if leak detection sensor 224 determines a leak may be occurring, a notification may be provided to a user via wireless device 216 and/or display device 160 by television receiver 150 or overlay device 251. If a user does not clear the notification, the flow of water may be shut off by leak detection sensor 224 after a predefined period of time. A user may also be able to provide input to allow the flow of water to continue or to immediately interrupt the flow of water.

VoIP (voice over IP) controller 225 may permit television receiver 150 to serve as a hub for a home phone system. One or more conventional telephones may be connected with television receiver 150. Calls may be converted to IP by television receiver 150, which may further allow for calls to be received and placed via network 270 that is connected with the Internet. The need for a dedicated home phone line may thus be eliminated. In some embodiments, a cellular back channel (e.g., via a cellular modem) may be utilized as a backup to other types of internet connections, such as DSL, cable modems, or satellite internet.

Appliance controller 226 may permit a status of an appliance to be retrieved and commands to control operation to be sent to an appliance by television receiver 150 or overlay device 251. For instance, appliance controller 226 may control a washing machine, a dryer, a dishwasher, an oven, a microwave, a refrigerator, a toaster, a coffee maker, a hot tub, or any other form of appliance. Appliance controller 226 may be connected with the appliance or may be integrated as part of the appliance. Appliances and other electronic devices may also be monitored for electricity usage. For instance, US Pat. Pub. No. 2013/0318559, filed Nov. 19, 2012, to Crabtree, entitled "Apparatus for Displaying Electrical Device Usage Information on a Television Receiver," which is hereby incorporated by reference, may allow for information regarding the electricity usage of one or more devices (e.g., other home automation devices or circuits within a home that are monitored) to be determined. Control of one or more home automation devices may be dependent on electrical usage and stored electrical rates. For instance, a washing machine may be activated in the evening when rates are lower. Additionally or alternatively, operation of devices may be staggered to help prevent consuming too much power at a given time. For instance, an electric heater may not be activated until a dryer powered via the same circuit is powered down.

Garage door controller 228 may permit a status of a garage door to be checked and the door to be opened or closed by a user via television receiver 150 or overlay device 251. In some embodiments, based on a location of wireless device 216, the garage door may be controlled. For instance, if wireless device 216 is a cellular phone and it is detected to have moved a threshold distance away from a house having garage door controller 228 installed, a notification may be sent to wireless device 216. If no response is received within a threshold period of time, the garage may be automatically shut. If wireless device 216 moves within a threshold distance of garage door controller 228, the garage may be opened.

Lock controller 230 may permit a door to be locked and unlocked and/or monitored by a user via television receiver 150 or overlay device 251. In some embodiments, lock controller 230 may have an integrated door sensor 208 to determine if the door is open, shut, or partially ajar. Being able to only determine if a door is locked or unlocked may not be overly useful—for instance, a lock may be in a locked position, but if the door is ajar, the lock may not prevent access to the house. Therefore, for security, a user may benefit from knowing both that a door is closed (or open) and locked (or unlocked). To accomplish such notification and control, lock controller 230 may have an integrated door sensor 208 that allows for the single lock controller 230 to lock/unlock a door and provide a status as to whether the door is open or shut. Therefore, a single device may control a lock and determine whether the associated door is shut or open. Such a single device may have a single power source that allows for sensing of the lock position, sensing of the door position, and for engagement/disengagement of the lock. Lock controller 230 may have an integrated door sensor that includes a reed switch or proximity sensor that detects when the door is in a closed position. Other forms of sensing may also be used, such as a proximity sensor to detect a doorframe. In some embodiments, door sensor 208 may be separate from lock controller. Further, door sensor 208 may allow the system to record open/shut times for analysis.

A home security system 207 may be integrated with a home automation system. The home security system 207 may detect motion, when a user has armed/disarmed the home security system 207, when windows/doors are opened or broken, etc. Television receiver 150 may adjust settings of home automation devices based on home security system 207 being armed or disarmed. A virtual control and alarm panel may be presented to a user via a display device 160 and television receiver 150. The functions of a wall mounted panel alarm can be integrated in the graphical user interface of the TV viewing experience such as a menu system with an underlying tree structure. The virtual control and alarm panel can appear in a full screen or Picture-in-Picture (PiP) with TV content. Alarms and event notification can be in the form of scrolling text overlays, popups, flashing icons, etc. Camera video (e.g., from camera 212) can be integrated with the standard DVR content of television receiver 150 with additional search, zoom, time-line capabilities. The camera's video stream can be displayed full screen, PiP with TV content, or as a tiled mosaic to display multiple camera's streams at a same time. In some embodiments, the display can switch between camera streams at fixed intervals. Television receiver 150 may perform video scaling, adjust frame rate and transcoding on video received from camera 212. In addition, television receiver 150 may adaptively transcode the camera content to match an Internet connection.

In some embodiments, alarm device 253 may be a separate device or integrated with another component of the system 200. In various embodiments, alarm device 253 may be configured to perform any one or combination of alarm functions disclosed herein. Further, alarm device 253 may be, include, or otherwise perform the functions of alarm clock. Alarm device 253 may be configured to operate in conformance with one or more personalized profiles disclosed herein.

Irrigation controller 232 may allow for a status and control of an irrigation system (e.g., sprinkler system) to be controlled by a user via television receiver 150 and/or overlay device 251. Irrigation controller 232 may be used in conjunction with weather sensor 206 to determine whether and/or for how long irrigation controller 232 should be activated for watering. Further, a user, via television receiver 150 and/or overlay device, may turn on, turn off, or adjust settings of irrigation controller 232.

One or more motion sensors can be incorporated into one or more of the previously detailed home automation devices or as a stand-alone device. Such motion sensors may be used to determine if a structure is occupied. Such information may be used in conjunction with a determined location of one or more wireless devices. If some or all users are not present in the structure, home automation settings may be adjusted, such as by lowering a temperature of thermostat 222, shutting off lights via light controller 220, and determining if one or more doors are closed by door sensor 208. In some embodiments, a user-defined script may be run when it is determined that no users or other persons are present within the structure.

Additional forms of sensors not illustrated in FIG. 2 may also be incorporated as part of a home automation system. For instance, a mailbox sensor may be attached to a mailbox to determine when mail is present and/or has been picked up. The ability to control one or more showers, baths, and/or faucets from television receiver 150 and/or wireless device 216 may also be possible. Pool and/or hot tub monitors may be incorporated into a home automation system. Such sensors may detect whether or not a pump is running, water temperature, pH level, a splash/whether something has fallen in, etc. Further, various characteristics of the pool and/or hot tub may be controlled via the home automation system. In some embodiments, a vehicle dashcam may upload or otherwise make video/audio available to television receiver 150 when within range. For instance, when a vehicle has been parked within range of a local wireless network with which television receiver 150 is connected, video and/or audio may be transmitted from the dashcam to the television receiver for storage and/or uploading to a remote server.

The home automation functions detailed herein that are attributed to television receiver 150 may alternatively or additionally be incorporated into overlay device 251. As such, a separate overlay device 251 may be connected with display device 160 to provide home automation functionality.

Figure 3:
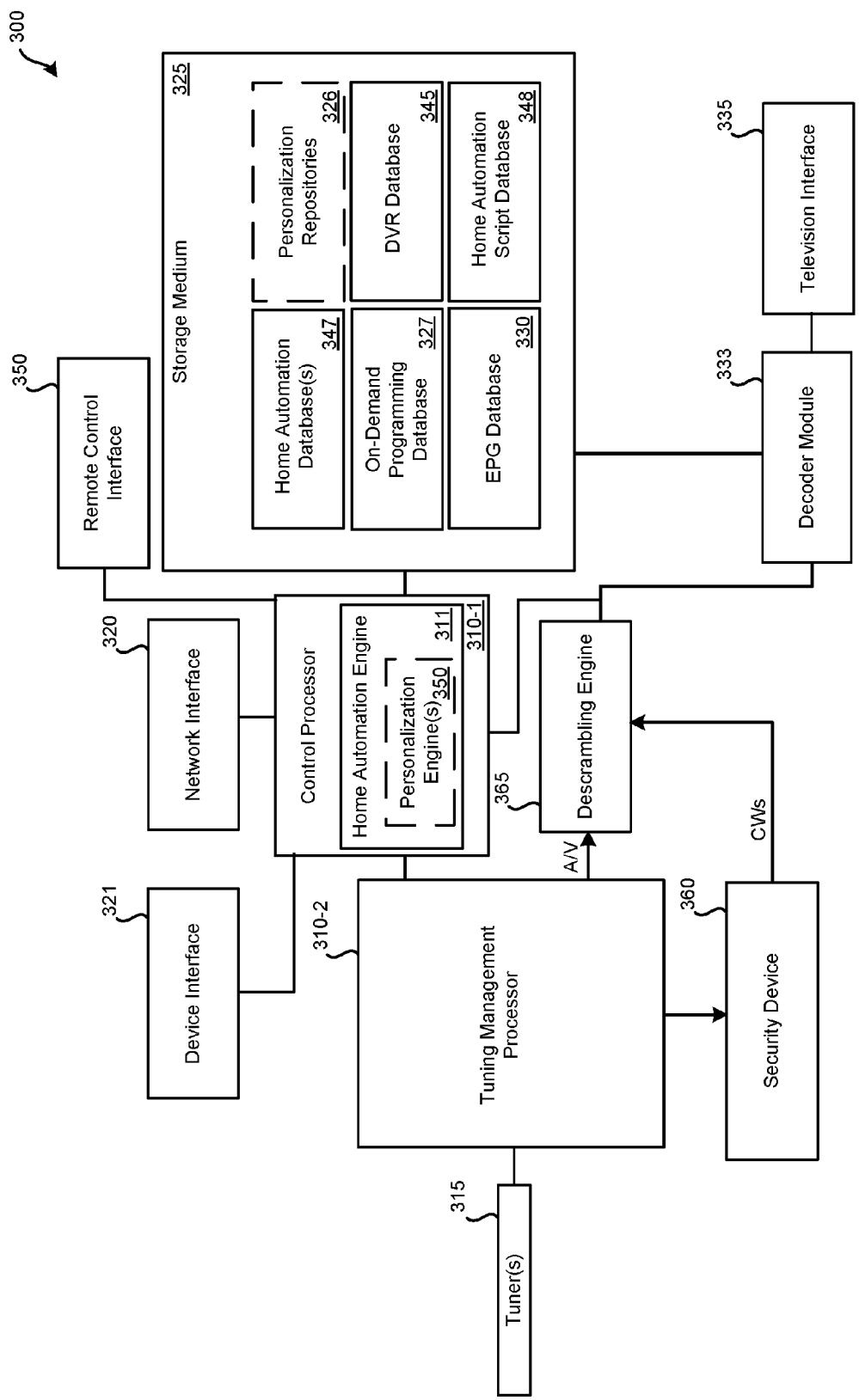
FIG. 3 illustrates an embodiment of a television receiver configured to host a home automation system, in accordance with certain embodiments of the present disclosure.

Turning now to FIG. 3, FIG. 3 illustrates an embodiment of a television receiver 300, which may represent television receiver 150 of FIG. 1 and/or FIG. 2, in accordance with certain embodiments of the present disclosure. Television receiver 300 may be configured to function as a host for a home automation system either alone or in conjunction with a communication device, such as communication device 252 of FIG. 2. Television receiver 300 may be in the form of a separate device configured to be connected with a display device, such as a television. Embodiments of television receiver 300 can include set top boxes (STBs). In addition to being in the form of an STB, a television receiver may be incorporated as part of another device, such as a television, other form of display device, video game console, computer, mobile phone or tablet or the like. For example, a television may have an integrated television receiver (which does not involve an external STB being coupled with the television).

Television receiver 300 may be incorporated as part of a television, such as display device 160 of FIG. 1. Television receiver 300 may include: processors 310 (which may include control processor 310-1, tuning management processor 310-2, and possibly additional processors), tuners 315, network interface 320, non-transitory computer-readable storage medium 325, personalization repositories 326, electronic programming guide (EPG) database 330, television interface 335, digital video recorder (DVR) database 345 (which may include provider-managed television programming storage and/or user-defined television programming), on-demand programming database 327, home automation settings database 347, home automation script database 348, security device 360, and/or descrambling engine 365. In another aspect, the television receiver 300 may include a personalization engine(s) 350, which may be provided for with the storage medium 325 and/or the control processor 310-1, such as the home automation engine 311 of the control processor 310-1.

In other embodiments of television receiver 300, fewer or greater numbers of components may be present. It should be understood that the various components of television receiver 300 may be implemented using hardware, firmware, software, and/or some combination thereof. Functionality of components may be combined; for example, functions of descrambling engine 365 may be performed by tuning management processor 310-2. Further, functionality of components may be spread among additional components. For instance, the home automation settings database 347, home automation script database 348, and/or personalization engine(s) 350 may be provided for, wholly or partly, in the overlay device 241.

Processors 310 may include one or more specialized and/or general-purpose processors configured to perform processes such as tuning to a particular channel, accessing and displaying EPG information from EPG database 330, and/or receiving and processing input from a user. It should be understood that the functions performed by various modules of FIG. 3 may be performed using one or more processors. As such, for example, functions of descrambling engine 365 may be performed by control processor 310-1.

Control processor 310-1 may communicate with tuning management processor 310-2. Control processor 310-1 may control the recording of television channels based on timers stored in DVR database 345. Control processor 310-1 may also provide commands to tuning management processor 310-2 when recording of a television channel is to cease. In addition to providing commands relating to the recording of television channels, control processor 310-1 may provide commands to tuning management processor 310-2 that indicate television channels to be output to decoder module 333 for output to a display device. Control processor 310-1 may also communicate with network interface 320, device interface 321, and/or a remote control interface. Control processor 310-1 may handle incoming data from network interface 320 and device interface 321, which may receive input from a remote control. Additionally, control processor 310-1 may be configured to output data via network interface 320.

Control processor 310-1 may include the home automation engine 311. Home automation engine 311 may permit television receiver 300 and control processor 310-1 to provide home automation functionality. Home automation engine 311 may have a JSON (JavaScript Object Notation) command interpreter or some other form of command interpreter that is configured to communicate with wireless devices via network interface 320 and a message server (possibly via a message server client). Such a command interpreter of home automation engine 311 may also communicate via a local area network with devices (without using the Internet). Home automation engine 311 may contain multiple controllers specific to different protocols; for instance, a ZigBee® controller, a Z-Wave® controller, and/or an IP camera controller (wireless LAN, 802.11) may be present. Home automation engine 311 may contain a media server configured to serve streaming audio and/or video to remote devices (on a local area network or the Internet). Television receiver may be able to serve such devices with recorded content, live content, and/or content recorded using one or more home automation devices, such as camera 212.

Tuners 315 may include one or more tuners used to tune to transponders that include broadcasts of one or more television channels. Such tuners may be used also to receive for storage on-demand content and/or credit-earning television commercials and/or home automation functions. In some embodiments, two, three, or more than three tuners may be present, such as four, six, or eight tuners. Each tuner contained in tuners 315 may be capable of receiving and processing a single transponder stream from a satellite transponder (or from a cable network) at a given time. As such, a single tuner may tune to a single transponder stream at a given time. If tuners 315 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 315 may be used to receive the signal containing the multiple television channels for presentation and/or recording. Tuners 315 may receive commands from tuning management processor 310-2. Such commands may instruct tuners 315 to which frequencies are to be tuned.

Network interface 320 may be used to communicate via an alternate communication channel with a television service provider, if such communication channel is available. A communication channel may be via satellite (which may be unidirectional to television receiver 300) and the alternate communication channel (which may be bidirectional) may be via a network, such as the Internet. Data may be transmitted from television receiver 300 to a television service provider system and from the television service provider system to television receiver 300. Information may be transmitted and/or received via network interface 320. For instance, instructions from a television service provider may also be received via network interface 320, if connected with the Internet. Besides the primary communication channel being satellite, cable network, an IP-based network, or broadcast network may be used. Network interface 320 may permit wireless communication with one or more types of networks, including using home automation network protocols and wireless network protocols. Also, wired networks may be connected to and communicated with via network interface 320. Device interface 321 may represent a USB port or some other form of communication port that permits communication with a communication device.

Storage medium 325 may represent one or more non-transitory computer-readable storage mediums. Storage medium 325 may include memory and/or a hard drive. Storage medium 325 may be used to store information received from one or more satellites and/or information received via network interface 320. Storage medium 325 may store information related to personalization repositories 326 (described further below), on-demand programming database 327, EPG database 330, DVR database 345, home automation settings database 347, and/or home automation script database 348. Recorded television programs may be stored using storage medium 325 as part of DVR database 345. Storage medium 325 may be partitioned or otherwise divided (such as into folders) such that predefined amounts of storage medium 325 are devoted to storage of television programs recorded due to user-defined timers and stored television programs recorded due to provider-defined timers.

Home automation settings database 347 may allow configuration settings of home automation devices and user preferences to be stored. Home automation settings database 347 may store data related to various devices that have been set up to communicate with television receiver 300. For instance, home automation settings database 347 may be configured to store information on which types of events should be indicated to users, to which users, in what order, and what communication methods should be used. For instance, an event such as an open garage may only be notified to certain wireless devices (e.g., a cellular phone associated with a parent, not a child), notification may be by a third-party notification server, email, text message, and/or phone call. In some embodiments, a second notification method may only be used if a first fails to prompt a response (e.g., to address a security condition with a selection of a user-selectable option provided with the notification). For instance, if a notification cannot be sent to the user via a third-party notification server, an email may be sent.

Home automation settings database 347 may store information that allows for the configuration and control of individual home automation devices which may operate using Z-Wave and ZigBee-specific protocols. To do so, home automation engine 311 may create a proxy for each device that allows for settings for the device to be passed through a UI (e.g., presented on a television) to allow for settings to be solicited for and collected via a user interface presented by television receiver or overlay device. The received settings may then be handled by the proxy specific to the protocol, allowing for the settings to be passed on to the appropriate device. Such an arrangement may allow for settings to be collected and received via a UI of the television receiver or overlay device and passed to the appropriate home automation device and/or used for managing the appropriate home automation device.

Home automation script database 348 may store scripts that detail how home automation devices are to function based on various events occurring. For instance, if stored content starts being played back by television receiver 300, lights in the vicinity of display device 160 may be dimmed and shades may be lowered by shade controller 204. As another example, when a user shuts programming off late in the evening, there may be an assumption the user is going to bed. Therefore, the user may configure television receiver 300 to lock all doors via lock controller 230, shut the garage door via garage controller 228, lower a heat setting of thermostat 222, shut off all lights via light controller 220, and determine if any windows or doors are open via window sensor 210 and door sensor 208 (and, if so, alert the user). Such scripts or programs may be predefined by the home automation/television service provider and/or may be defined by a user.

In some embodiments, home automation script database 248 may allow for various music profiles to be implemented. For instance, based on home automation settings within a structure, appropriate music may be played. For instance, if the lights are dimmed, romantic music may be played. Conversely, based on the music being played, settings of home automation devices may be determined. If television programming, such as a movie, is output for playback by television receiver 150, a particular home automation script may be used to adjust home automation settings (e.g., lower lights, raise temperature, and lock doors).

EPG database 330 may store information related to television channels and the timing of programs appearing on such television channels. EPG database 330 may be stored using storage medium 325, which may be a hard drive or solid-state drive. Information from EPG database 330 may be used to inform users of what television channels or programs are popular and/or provide recommendations to the user. Information from EPG database 330 may provide the user with a visual interface displayed by a television that allows a user to browse and select television channels and/or television programs for viewing and/or recording. Information used to populate EPG database 330 may be received via network interface 320, via satellite, or some other communication link with a television service provider (e.g., a cable network). Updates to EPG database 330 may be received periodically. EPG database 330 may serve as an interface for a user to control DVR functions of television receiver 300, and/or to enable viewing and/or recording of multiple television channels simultaneously. EPG database 340 may also contain information about on-demand content or any other form of accessible content.

Decoder module 333 may serve to convert encoded video and audio into a format suitable for output to a display device. For instance, decoder module 333 may receive MPEG video and audio from storage medium 325 or descrambling engine 365 to be output to a television. MPEG video and audio from storage medium 325 may have been recorded to DVR database 345 as part of a previously-recorded television program. Decoder module 333 may convert the MPEG video and audio into a format appropriate to be displayed by a television or other form of display device and audio into a format appropriate to be output from speakers, respectively. Decoder module 333 may have the ability to convert a finite number of television channel streams received from storage medium 325 or descrambling engine 365, simultaneously. For instance, decoders within decoder module 333 may be able to only decode a single television channel at a time. Decoder module 333 may have various numbers of decoders.

Television interface 335 may serve to output a signal to a television (or another form of display device) in a proper format for display of video and playback of audio. As such, television interface 335 may output one or more television channels and/or stored television programming from storage medium 325 (e.g., television programs from DVR database 345, television programs from on-demand programming 330 and/or information from EPG database 330) to a television for presentation. Television interface 335 may also serve to output a CVM.

Digital Video Recorder (DVR) functionality may permit a television channel to be recorded for a period of time. DVR functionality of television receiver 300 may be managed by control processor 310-1. Control processor 310-1 may coordinate the television channel, start time, and stop time of when recording of a television channel is to occur. DVR database 345 may store information related to the recording of television channels. DVR database 345 may store timers that are used by control processor 310-1 to determine when a television channel should be tuned to and its programs recorded to DVR database 345 of storage medium 325. In some embodiments, a limited amount of storage medium 325 may be devoted to DVR database 345. Timers may be set by the television service provider and/or one or more users of television receiver 300.

DVR database 345 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 300 via the television provider's network. For example, in a satellite-based television service provider system, data necessary to create the provider-defined timers at television receiver 150 may be received via satellite.

On-demand programming database 327 may store additional television programming. On-demand programming database 327 may include television programming that was not recorded to storage medium 325 via a timer (either user- or provider-defined). Rather, on-demand programming may be programming provided to the television receiver directly for storage by the television receiver and for later presentation to one or more users. On-demand programming may not be user-selected. As such, the television programming stored to on-demand programming database 327 may be the same for each television receiver of a television service provider. On-demand programming database 327 may include pay-per-view (PPV) programming that a user must pay and/or use an amount of credits to view. For instance, on-demand programming database 327 may include movies that are not available for purchase or rental yet. Typically, on-demand programming is presented commercial-free.

Referring back to tuners 315, television channels received via satellite (or cable) may contain at least some scrambled data. Packets of audio and video may be scrambled to prevent unauthorized users (e.g., nonsubscribers) from receiving television programming without paying the television service provider. When a tuner of tuners 315 is receiving data from a particular transponder of a satellite, the transponder stream may be a series of data packets corresponding to multiple television channels. Each data packet may contain a packet identifier (PID), which can be determined to be associated with a particular television channel. Particular data packets, referred to as entitlement control messages (ECMs), may be periodically transmitted. ECMs may be associated with another PID and may be encrypted; television receiver 300 may use decryption engine 361 of security device 360 to decrypt ECMs. Decryption of an ECM may only be possible if the user has authorization to access the particular television channel associated with the ECM. When an ECM is determined to correspond to a television channel being stored and/or displayed, the ECM may be provided to security device 360 for decryption.

Tuning management processor 310-2 may be in communication with tuners 315 and control processor 310-1. Tuning management processor 310-2 may be configured to receive commands from control processor 310-1. Such commands may indicate when to start/stop receiving and/or recording of a television channel and/or when to start/stop causing a television channel to be output to a television. Tuning management processor 310-2 may control tuners 315. Tuning management processor 310-2 may provide commands to tuners 315 that instruct the tuners as to which satellite, transponder, and/or frequency to tune. From tuners 315, tuning management processor 310-2 may receive transponder streams of packetized data.

Descrambling engine 365 may use the control words output by security device 360 in order to descramble video and/or audio corresponding to television channels and/or home automation functions for storage and/or presentation. Video and/or audio data contained in the transponder data stream received by tuners 315 may be scrambled. Video and/or audio data may be descrambled by descrambling engine 365 using a particular control word. Which control word output by security device 360 to be used for successful descrambling may be indicated by a scramble control identifier present within the data packet containing the scrambled video or audio. Descrambled video and/or audio may be output by descrambling engine 365 to storage medium 325 for storage (in DVR database 345) and/or to decoder module 333 for output to a television or other presentation equipment via television interface 335.

In some embodiments, the television receiver 300 may be configured to periodically reboot in order to install software updates downloaded over the network 190 or satellites 130. Such reboots may occur for example during the night when the users are likely asleep and not watching television. If the system utilizes a single processing module to provide television receiving and home automation functionality, then the security functions may be temporarily deactivated. In order to increase the security of the system, the television receiver 300 may be configured to reboot at random times during the night in order to allow for installation of updates. Thus, an intruder is less likely to guess the time when the system is rebooting. In some embodiments, the television receiver 300 may include multiple processing modules for providing different functionality, such as television receiving functionality and home automation, such that an update to one module does not necessitate reboot of the whole system. In other embodiments, multiple processing modules may be made available as a primary and a backup during any installation or update procedures.

For simplicity, television receiver 300 of FIG. 3 has been reduced to a block diagram; commonly known parts, such as a power supply, have been omitted. Further, some routing between the various modules of television receiver 300 has been illustrated. Such illustrations are for exemplary purposes only. The state of two modules not being directly or indirectly connected does not indicate the modules cannot communicate. Rather, connections between modules of the television receiver 300 are intended only to indicate possible common data routing. It should be understood that the modules of television receiver 300 may be combined into a fewer number of modules or divided into a greater number of modules. Further, the components of television receiver 300 may be part of another device, such as built into a television. Television receiver 300 may include one or more instances of various computerized components, such as disclosed in relation to computer system described further below.

While the television receiver 300 has been illustrated as a satellite-based television receiver, it is to be appreciated that techniques below may be implemented in other types of television receiving devices, such a cable receivers, terrestrial receivers, IPTV receivers or the like. In some embodiments, the television receiver 300 may be configured as a hybrid receiving device, capable of receiving content from disparate communication networks, such as satellite and terrestrial television broadcasts. In some embodiments, the tuners may be in the form of network interfaces capable of receiving content from designated network locations. The home automation functions of television receiver 300 may be performed by an overlay device. If such an overlay device, television programming functions may still be provided by a television receiver that is not used to provide home automation functions.

Figure 4:
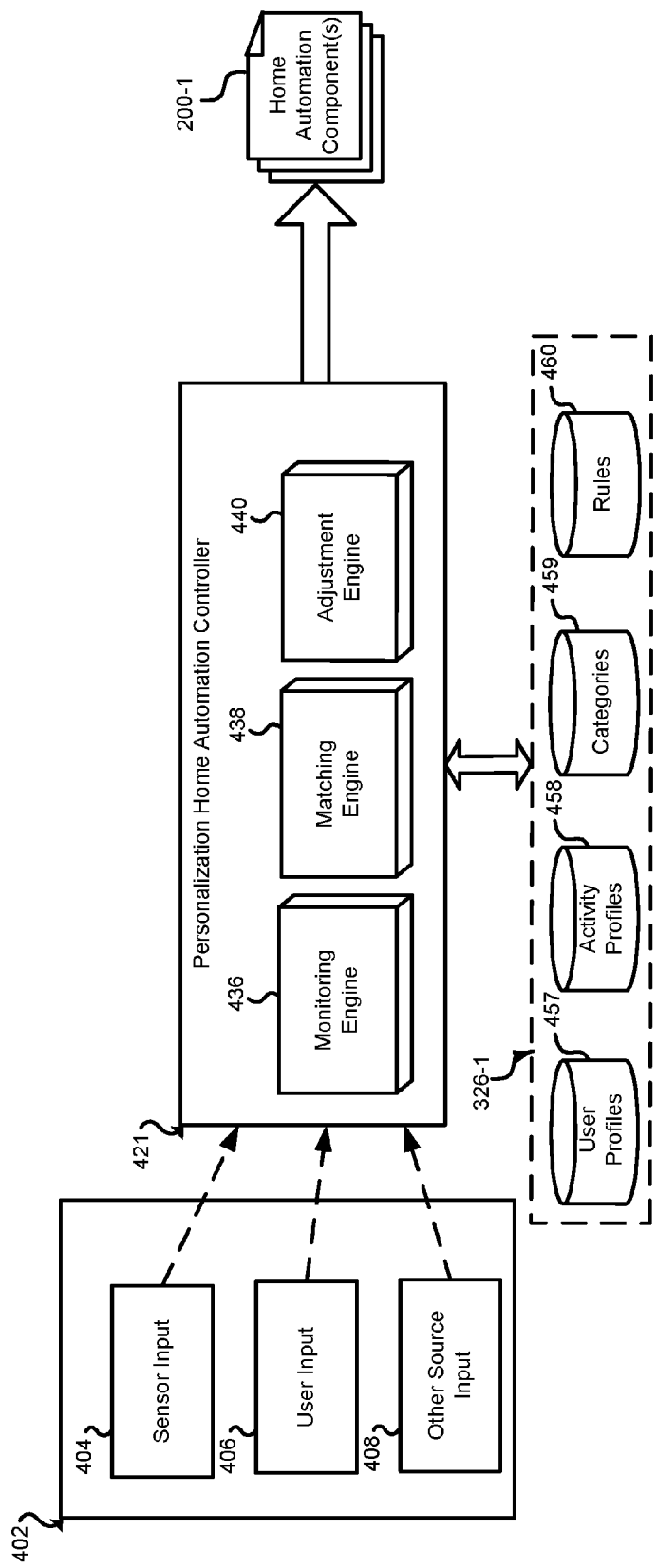
FIG. 4 illustrates an embodiment of a subsystem to facilitate personalized home automation control based at least in part on individualized audio differentiation of carbon monoxide detectors, in accordance with certain embodiments of the present disclosure.

FIG. 4 illustrates a subsystem 400 to facilitate personalized home automation control based at least in part on individualized protocol, in accordance with certain embodiments of the present disclosure. In some embodiments, the subsystem 400 may correspond to aspects of the system 100, 200, and/or 300. While the subsystem 400 is illustrated as being composed of multiple components, it should be understood that the subsystem 400 may be broken into a greater number of components or collapsed into fewer components. Each component may include any one or combination of computerized hardware, software, and/or firmware. In various embodiments, the subsystem 400 includes a personalization home automation system controller and/or control engine 421, including the home automation engine 311 and/or the personalization engine 350 executed by one or more processors and may be implemented with the television receiver 150, overlay device 251, and/or another device, such as a computing device, a standalone system controller device, a system controller device integrated with another device, such as a security system control device, thermostat device, etc.

The personalized controller 421 may be communicatively coupled with interface components and communication channels (which may take various forms in various embodiments as disclosed herein) configured to receive adjustment input 402. As depicted, the adjustment input 402 may include sensor input 404. The subsystem 400 may process sensor input 404 and analyze the sensor input 404 to provide for personalized home automation control based at least in part on individualized protocol. The sensor input 404 may be captured by any or combination of the sensors/detectors disclosed herein.

The adjustment input 402 may include user input 406. The user input 406 may include real-time user control via a user interface (e.g., one or more interfaces provided via wireless device 216, communication device 252, television receiver 150, overlay device 251, and/or the like). The user input 406 may include user preferences. One or more storage repositories (which could correspond to storage medium 325, in some embodiments, or other storage of the device 421 in other embodiments) may store one or more personalized profiles 326-1. The one or more personalized profiles 326-1 may include one or more user profiles 457 that may include user preferences, user notification particulars (e.g., contact information, method of notification such push notifications, phone calls with automated voice messages, text messaging, instant messages, messaging with a home automation app and/or with a third-party app, etc.), and/or the like. User profiles 457 may include profiles for multiple users. In some embodiments, a user is permitted to select which user profile of user profiles 457 is dominant via a user interface. For example, a user may indicate precedence information that identifies which user profile should take precedence over one or more other user profiles (e.g., when multiple individuals are detected to be present in a particular location/room/zone, one individual's preference could be controlling in some embodiments). In some embodiments, user profiles 457 may include preferences for customized home automation control disclosed herein. The preferences could include customized device settings and rules. The user profiles 457 may further include user feedback received from the user regarding customizations. The feedback data may be used to refine the customizations for particular individuals and situations.

The adjustment input 402 may include other source input 408, which could correspond to input from one or more other sources that may include any suitable sensor input or other data source input. The one or more other sources could include any suitable sensor or other data source, which could be network-accessible, such as a service provider or private/public data source. For example, in some embodiments, a service provider or other data source may push indications of local outside conditions (e.g., daylight conditions, temperature, humidity, precipitation, other weather conditions, etc.) to the controller 421. Alternatively or additionally, the controller 421 may pull indications of local outside conditions from a service provider or other data source. As another example, in some embodiments, a service provider or other data source may facilitate locating a user of a mobile communication device, for example, by use GPS coordinates, cellular tower triangulation techniques, WiFi-based location information, carrier-provided location information, and/or other location determination systems to identify a location of the mobile communication device and/or that the user is currently using the mobile communication device. Any suitable data may be acquired by the system controller 421 from one or more other sources.

Figure 5:
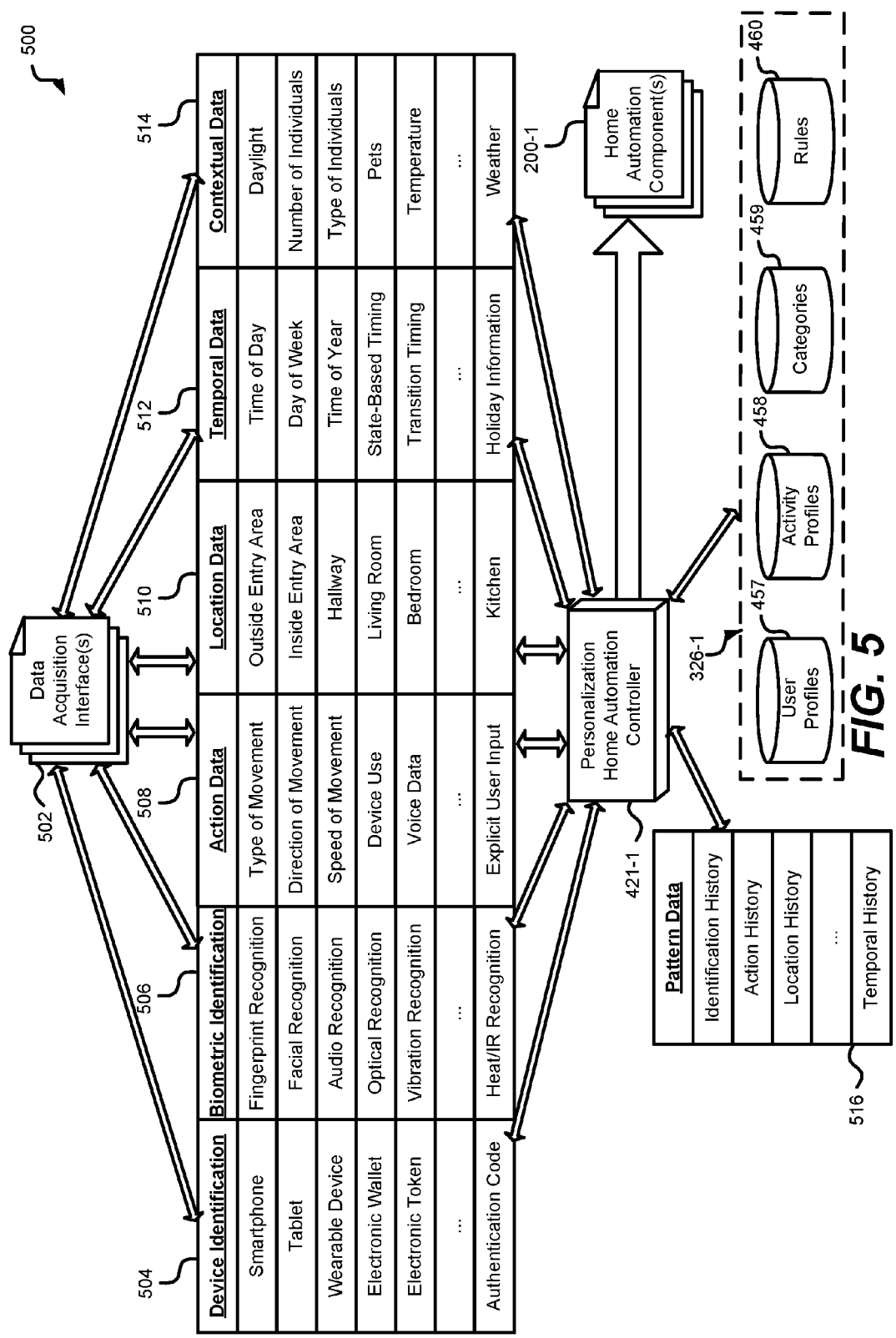
FIG. 5 illustrates certain aspects of personalized data flow, in accordance with certain embodiments of the present disclosure.

The personalized controller 421 may include a monitoring engine 436 configured to monitor the adjustment input 402 for any suitable aspects pertaining to individuals in and/or about the home to facilitate personalization features disclosed herein. For example, the monitoring engine 436 may process information enabling identification of individuals and individual states. FIG. 5 illustrates certain aspects of personalized data flow 500, in accordance with certain embodiments of the present disclosure. The personalization home automation controller 421-1 may be configured to gather personalized data, which may be specific to a particular individual and/or may be generally related to the particular individual's context. The personalized data may be gathered from one or more data repositories of the system, such as personalization data store(s) 326, and/or one or more data sources via data acquisition interface(s) 502.

In various embodiments, the one or more data sources may include any one or combination of various data sources disclosed herein, such as sources of adjustment input 402, sensor input 404, user input 406, other source input 408, and/or the like. In various embodiments, the data from the one or more data sources may be retrieved and/or received by the personalization home automation controller 421-1 via the one or more data acquisition interface(s) 502, which may include interfaces of the personalization home automation controller 421-1, components of the home automation ecosystem 200, the television receiver 300, and/or the like—through network(s) 270, through any suitable means for direct communication, and/or through any other suitable means of transferring data. According to certain embodiments, data may be actively gathered and/or pulled from one or more data sources via one or more networks, for example, by accessing a third party repository and/or by "crawling" various repositories. Certain data pulled and/or pushed from the one or more data sources may be transformed and the transformed data and/or other data generated based thereon may be made available by the personalization home automation controller 421-1.

In some embodiments, the one or more data acquisition interface(s) 502 may include one or more application programming interfaces (APIs) that define protocols and routines for interfacing with the data sources (e.g., sensors, computing devices, communication devices, wearable devices, third-party data sources, and/or the like). The APIs may specify application programming interface (API) calls to/from data source components and/or systems. In some embodiments, the APIs may include a plug-in to integrate with an application of a data components and/or systems. The one or more data acquisition interfaces 502, in some embodiments, could use a number of API translation profiles configured to allow interface with the one or more additional applications of the data sources to access data (e.g., a database or other data store) of the data sources. The API translation profiles may translate the protocols and routines of the data source component and/or system to integrate at least temporarily with the system and allow communication with the system (one-way communication to the system and/or two-way communication with system in various embodiments) by way of API calls. Data, as referenced herein, may correspond to any one or combination of raw data, unstructured data, structured data, information, and/or content which may include media content, text, documents, files, instructions, code, executable files, images, video, audio, and/or any other suitable content suitable for embodiments of the present disclosure.

The personalized data may include device identification data 504, such as information to facilitate detection, recognition, and differentiation of any one or combination of smart phones, tablets, wearable computing/communication devices (e.g., smartwatches, smartglasses, wearable fitness, health, and/or lifestyle monitors, and/or the like), other computing devices, electronic wallets, electronic tokens, authentication codes (e.g., key codes entered with a keypad or another input device), and/or the like. The personalized data may include biometric identification data 506, such as any information to facilitate one or combination of fingerprint recognition, facial recognition, audio recognition, optical recognition, vibration recognition, heat recognition, infrared recognition, and/or the like. The personalized data may include action data 508, such as any information to facilitate detection, recognition, and differentiation of one or combination of types of movements, directions of movements, speeds of movements, device use, voice data, explicit user input, and/or the like. The personalized data may include location data 510, such as any information to facilitate detection, recognition, and differentiation of one or combination of locations in and/or about the home. For instance, the location data 510 may include information about outside entry areas, inside entry areas, hallways, living rooms, bedrooms, family rooms, kitchens, backyards, front yards, and/or the like. The personalized data may include temporal data 512, such as any information to facilitate detection, recognition, and differentiation of one or combination of temporal factors that may bear on, and enhance, personalization features disclosed herein. For instance, the temporal data 512 may include time of day information, time of week information, time of year information, state-based timing information, transition timing information, holiday information, travel information, and/or the like. The personalized data may include contextual data 514, such as any information to facilitate detection, recognition, and differentiation of one or combination of contextual factors that may bear on, and enhance, personalization features disclosed herein. For instance, the contextual data 514 may include information about daylight conditions, numbers of individuals in and/or about the home, types of individuals in and/or about the home, pets, interior temperatures, exterior conditions, weather conditions, and/or the like.

In some embodiments, the monitoring engine 436 of FIG. 4 may be configured to monitor device identification data 504, biometric identification data 506, action data 508, location data 510, temporal data 512, contextual data 514, and/or the like. Referring to FIG. 4, in some embodiments, the personalization controller 421 may include a matching engine 438 that may be an analysis engine. The matching engine 438 may be configured to perform any one or combination of features directed to matching or otherwise correlating information about individuals, device identification data 504, biometric identification data 506, action data 508, location data 510, temporal data 512, contextual data 514, and/or the like. In some embodiments, the monitoring engine 436 and/or the matching engine 438 may facilitate one or more learning/training modes disclosed herein.

In some embodiments, the monitoring engine 436 may gather and process adjustment input 402 to facilitate creation, development, and/or use of personalized profiles 326-1, including user profiles 457, activity profiles 458, categories 459, and/or rules 460. The data may include any suitable data that may be captured to indicate, infer, and/or determine individual identification, actions, locations, temporal factors, contexts, and patterns for an individual. The captured data may be aggregated, consolidated, and transformed into personalized profiles. For example, in some embodiments, the matching engine 438 may determine individual characteristics based at least in part on adjustment input 402 received and processed by the monitoring engine 436. The matching engine 438 may define attributes of an individual sensed based at least in part on the individual characteristics.

In various embodiments, the matching engine 438 may generate, develop, and/or otherwise use user profiles 457, activity profiles 458, categories 459, and/or rules 460 for individuals sensed and/or for locations in the home based at least in part on adjustment input 402. Referring to FIG. 5, the matching engine 438 may, for example, correlate items of device identification data 504, biometric identification data 506, action data 508, location data 510, temporal data 512, and contextual data 514. The monitoring engine 436 may compile any one or combination of such data. As illustrated in the non-limiting examples of FIG. 5, the pattern data 516 may include information to facilitate detection, recognition, and differentiation of personalized patterns based at least in part on device identification data 504, biometric identification data 506, action data 508, location data 510, temporal data 512, contextual data 514, and/or the like. The matching engine 438 may include a reasoning module to make logical inferences from a set of the detected and differentiated data to infer one or more patterns of activity for particular individuals and/or for aspects of the home. For instance, the pattern data 516 may include information about any one or combination of identification histories, action histories, location histories, temporal histories, and/or the like, any set of which may be used to derive one or more patterns of activity for particular individuals and/or for aspects of the home. A pattern-based reasoner could be employed to use various statistical techniques in analyzing the data in order to make inferences based on the analysis. A transitive reasoner may be employed to infer relationships from a set of relationships related to sound data.

With respect to identification and/or security features, certain embodiments may establish a personalized data collection regarding each individual sensed. Each individual sensed may have a personalized collection. In some embodiments, each personalized collection may be unique. Some individuals not having previous personalized data captured by the system may be categorized as a guest, an unauthenticated guest, an intruder, simply unknown, and/or the like.

In some embodiments, the system automatically establishes and develops the personalized collections. However, the personalized collections may be set up and/or tailored by users. With some embodiments, the personalized collections may be automatically established and developed by the system, along with system-solicited feedback from the user. For example, the system may prompt a user to indicate household specifics, such as numbers and types of adults, elderly adults, small children, teenagers, mobility-restricted individuals (e.g., wheelchair users), pets, etc. As another example, having come to an inference about a particular user (such as turning on lights in a hallway when a first occupant walks from a living room toward a hallway during nighttime or other low-light conditions—or some other conclusion that the system derives via its reasoning module), the system may cause one or more user notifications (push notifications, interactive voice announcements, pop-ups on a user interface of the system, emails, automated phone calls, etc.) to be directed to the first user to allow the user to confirm, refine, and/or reject the system's inference.

Referring again to FIG. 4, in some embodiments, the monitoring engine 436 and/or the matching engine 438 may employ an ongoing learning mode to confirm, correct, and/or refine determinations made for the personalized profiles 326-1, including user profiles 457, activity profiles 458, categories 459, and/or rules 460, for individuals sensed and/or for locations in the home. For example, having come to one or more conclusions about individuals sensed and/or locations, the personalization home automation controller 421-1 may confirm and/or correct the determinations with feedback loop features. Certain embodiments may provide user with feedback options to facilitate the ongoing learning mode. User-selectable options (e.g., via a device interface, voice recognition with a microphone of one or more home automation components, etc.) provided with user notifications (e.g., push notifications to computing/communication devices, audio alerts via speakers of one or more home automation components, etc.) could be provided to allow a user to confirm or correct conditions detected. The feedback could be used for training the system to heuristically adapt conclusions, profiles, correlations, attributes, triggers, patterns, and/or the like.

With some embodiments, one or more individuals sensed may each have a unique personalized profile 326-1. A personalized profile 326-1 may include baseline attributes for activity profiles 458, categories 459, and/or rules 460 attributed to a particular individual. Subsequently detected data may be used, in conjunction with previously detected data, to adjust a personalized profile 326-1 for the particular individual. For example, baseline detected biometric data 506, action data 508, location data 510, temporal data 512, and/or contextual data 514 may be attributed to, and/or used to refine attributes for, the individual with an initialization process, and one or more subsequent detections may be compared to the baseline readings and/or attributes to determine changes between the baselines and the subsequent readings and/or attributes. Such differences may be used to develop the personalized profile 326-1 for the particular individual.

Having personalized profiles 326-1 which include distinct characteristics and attributes of each individual, the matching engine 438 may individually distinguish each individual, actions of the individual, locations corresponding to the actions, temporal aspects corresponding to the actions, and contexts corresponding to the action of the individual when the monitoring engine 436 receives and processes data corresponding to the individual.

The matching engine 438 may correlate captured device identification data 504 and/or biometric identification data 506 to previously captured and stored device identification data 504 and/or biometric identification data 506 in order to identify an individual. The matching engine 438 may be configured to match information for an individual captured via the monitoring engine 436 to one or more categories from a set of categories 412. In some embodiments, the matching engine 438 can receive sensor data corresponding to one or more individuals, identify attributes of the one or more individuals based at least in part on the sensor data, and match the one or more individuals to one or more categories from a category information repository 412. Any suitable category may be employed to facilitate adjustment features in accordance various embodiments. Certain categories disclosed herein may correspond to characterizations of individuals. By way of example, category information may include categories and corresponding criteria to qualify for particular categories such as movement toward or away from particular locations (reference locations), adults, elderly adults, small children, teenagers, mobility-restricted individuals (e.g., wheelchair users), pets, consistent occupants, periodic occupants, occasional occupants, unauthenticated guests, authenticated guests, intruders, service people, etc.

The matching engine 438 could use facial recognition to match data for an individual to image data retained by the system (e.g., in the user profiles 457) to determine whether a sensed individual is known or a new individual. Captured individual image data may be correlated to reference images 459 using any suitable facial trait qualifications for correlation. The matching engine 438 may link particular individual image data to user profiles 457 with image data associated with individuals, to identify a known person or a new person (e.g., based at least in part on satisfying one or more thresholds that may correspond to a tolerance range of the extent of matching characteristics, in some embodiments). In various embodiments, the matching engine 438 may match (e.g., based at least in part on satisfying one or more thresholds that may correspond to a tolerance range of the extent of matching characteristics, in some embodiments) any one or combination of types of device identification data 504, biometric identification data 506, action data 508, location data 510, temporal data 512, contextual data 514, and/or pattern data 516 determine and identification status of an individual and/or to cause home automation control in view of a particular individual.

The matching engine 438 may be configured to match information for input 402 captured via the monitoring engine 436 to one or more categories from a set of categories 459. Some embodiments may qualify captured data according to a graduated identification scale. Any suitable identification scale may be used in various embodiments. In some embodiments, an identification scale could entail a categorization scheme, with categories 459 such as strong identification of a particular individual, possible identification of a particular individual, weal identification of a particular individual, and an unknown individual, or any suitable categories such as other categories disclosed herein.

The one or more storage repositories 425 may include rules 458. In some embodiments, the rules 458 may include criteria for matching a set of indicia of individual state to a set of one or more categories. In some embodiments, the rules 458 may include criteria for matching captured data corresponding to a detected individual to one or more operational settings of one or more home automation components 200-1. In some embodiments, the rules 458 may include one or more arbitration rules for handling situations of multiple individuals.

The controller 421 may include an adjustment engine 440 which may be configured to cause one or more adjustments of home automation components 200-1. The adjustment engine 440 may analyze input monitored by the monitoring engine 436, determinations of the matching engine 438, and/or information stored in one or more repositories 326 to make adjustment determinations. Based at least in part on one or more adjustment determinations, the adjustment engine 440 may cause activation of one or more adjustment actions of the home automation components 200-1. As merely one illustrative example out of many possible examples, one pattern might indicate that on weekdays at around 7 AM an identified individual typically opens the garage door (say, in order to leave for work). The system may infer a rule that provides for automatically opening the garage door when the individual approaches the garage on weekdays at around 7 AM. However, when individual approaches the garage at other times of the day, say evening time, the system may not detect a sufficient frequency of opening the garage door, but the pattern may indicate that the individual typically turns on the lights in the garage at that time. Thus, the system made infer a rule the specifies only turning on the lights in the garage when the individual approaches the garage during evening hours.

Figure 6:
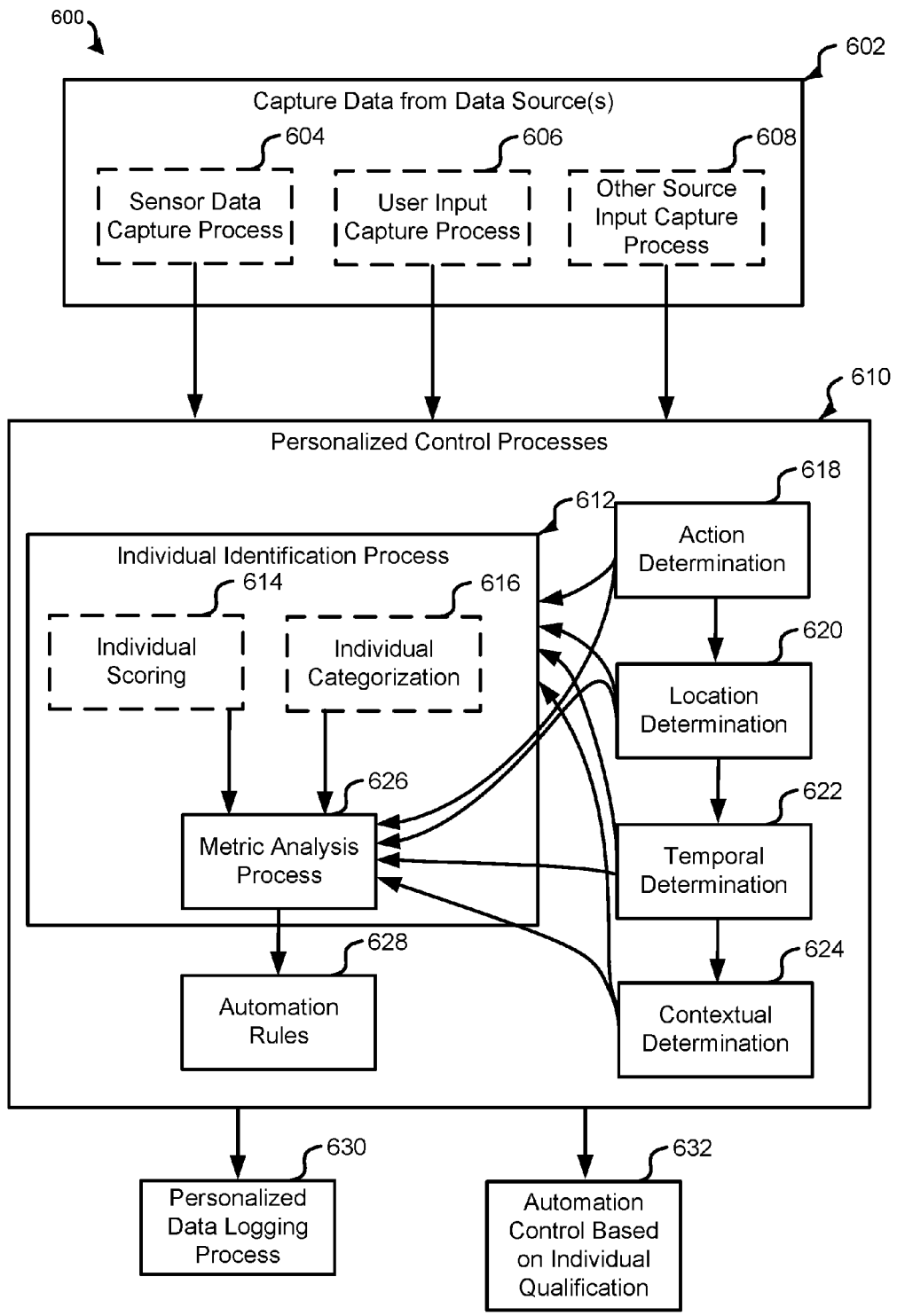
FIG. 6 illustrates certain aspects of a method for personalized home automation control based at least in part on individualized audio differentiation of carbon monoxide detectors, in accordance with certain embodiments of the present disclosure.

FIG. 6 depicts certain aspects of a method 600 for personalized home automation control based at least in part on individualized protocol, in accordance with certain embodiments of the present disclosure. Various embodiments may employ any one or combination of various methods of personalized home automation control. In various embodiments, the method 600 may be performed in whole or in part by the home automation system controller 421, the home automation engine 311, the personalization engine 350, and/or the like. As described above, such features may be provided for by a host system, which may, in some embodiments, include a television receiver 150, television receiver 300, overlay device 251, and/or a combination thereof. In an example, television receiver 150, 300 may be in operative communication with overlay device 251 that is further connected to various home automation devices. It is noted that the method 600 may include additional steps, and that any of the steps presented herein may be rearranged, optional, and/or modified to include other steps and/or features described in this application.

As indicated by block 602, one or more sets of data may be captured from one or more data sources. In some embodiments, different types of data may be captured from a variety of different data sources. As indicated by block 604, sensor data may be captured from a one or more sensors. The sensors could be disposed in and/or about the home, as disclosed herein. For example, the one or more sensors may include any one or combination of sensors, detectors, controllers, and/or other devices associated with any one or combination of components disclosed with respect to the home automation ecosystem 200 of FIG. 2. In some embodiments, the sensor data may correspond to user input. As indicated by block 606, user input may be captured. As indicated by block 608, other input from one or more other data sources may be captured.

As indicated by block 610, one or more personalized control processes may be based at least in part on the one or more sets of data may be captured from one or more data sources. The personalized control processes 610 may include one or more individual identification processes 612. The personalized control processes may include processes for action determination 618, location determination 620, temporal determination 622, and/or contextual determination 624. In some embodiments, any one or combination of such determinations may be utilized in the individual identification process 612 to identify an individual sensed. For example, determined actions 508, locations 510, temporal factors 512, and/or contextual factors 514 of an individual may be compared to corresponding patterns 516 that may have been previously determined for particular individuals to determine to what extent the detected indicia match the patterns. In some embodiments, such pattern-based analysis may be implemented as a supplement to identification process 612.

As indicated by block 612, having captured data, the control system may implement a one or more individual identification processes. The one or more individual identification processes 612 may include one or more metric analysis processes 626 to determine an identity of an individual sensed and a level of certainty with which the individual is identified (or not identified). Further, the one or more individual identification processes 612 may include one or more metric analysis processes 626 to determine one or more home automation rules 628 based at least in part on one or more sets of captured data 602. The one or more individual identification processes 612 may determine the one or more home automation rules 628 based at least in part on determined actions 508, locations 510, temporal factors 512, contextual factors 514 and/or corresponding patterns 516 attributed to an identified individual. Such factors may be taken into account with results from current processes (i.e., in real time along with an individual currently being sensed) and past processes (i.e., the results of which have been previously logged 630 and stored in the personalization data store 326 in association with the individual's profile) of action determination 618, location determination 620, temporal determination 622, and/or contextual determination 624. Accordingly, in various instances, identification processes 612 may yield an identification of an individual sensed and/or automation rules 628 for handling an insufficiently identified individual and/or a sufficiently identified individual.

Personalization data can be consolidated and processed to yield an identification score. Any one or combination of types of personalization data may be captured and qualified. Some embodiments may qualify an individual according to a graduated identification scale. Any suitable identification scale may be used in various embodiments. In some embodiments, an identification scale could entail a categorization scheme 616, with categories such as different adults, elderly adults, small children, teenagers, mobility-restricted individuals (e.g., wheelchair users), pets, consistent occupants, periodic occupants, occasional occupants, unauthenticated guests, authenticated guests, intruders, service people, and/or the like. In some embodiments, an identification scale could entail an individual scoring system 614. The individual scoring system 614 could be correlated to the category scheme in some embodiments, such that certain scores correspond to certain categories. Some embodiments may score an individual with a numerical expression, for example, an identification score.

For example, in some embodiments, an identification score may be an assessment of a certainty with which the system identifies an individual. By way of example without limitation, an identification scale could include a range of identification scores from 0 to 100, or from 0 to 1,000, with the high end of the scale indicating greater probability. Some embodiments may use methods of statistical analysis to derive an identification score. Various embodiments may determine an identification score based on any one or more suitable quantifiers. An identification score may be based at least in part on the extent to which detected characteristics of the captured data match previously determined characteristics stored in the profiles. In some embodiments, an identification score may be cumulative of individual scores based on matching each type of the characteristics. With an identification score determined, categorizations may be made based on the score. By way of example without limitation, a score correlated to a 75-100% band may be deemed a positive identification of an individual; a score correlated to a 50-75% band may be deemed a possible identification of an individual; a score correlated to a 25-50% band may be deemed a weak identification of an individual; a score below a 50% minimum threshold may be deemed a weak/insufficient identification of an individual; and score of zero may correspond to an unknown individual.

In some embodiments, a similar scoring scheme may be used to derive pattern of behavior and corresponding automation rules. For example, a similar scoring scheme may be used to determine one or more extents to which monitored sets of actions, locations, times, and/or contexts match other sets of actions, locations, times, and/or contexts for an individual. By way of example without limitation, a score correlated to a 75-100% band may be deemed a positive match; a score correlated to a 50-75% band may be deemed a possible match; a score correlated to a 25-50% band may be deemed a weak match; a score below a 50% minimum threshold may be deemed a weak/insufficient match; and score of zero may correspond to no correspondence. As a further example, detected actions may be compared and scored according to the correspondence of the actions and locations, where similar movement from one location to another location may increase the identification score (e.g., walking from a living room to a bedroom). The times of the actions may be compared and scored according to the correspondence of the times. The closer the times are to one another, the more the identification score may be increased, and, conversely, more difference between the times may correspond to lesser identification scores. For example, walking from a living room to a bedroom during weeknights during the time period of 10:00-10:15 PM may correspond to a higher score, than would walking to the bedroom at different times of day multiple hours apart. Likewise, the contexts of the actions may be compared and scored based on the correspondence.

The criteria for qualifying individuals may specify rules and thresholds for various types of identification data. For example, criteria for qualifying individuals may specify rules and thresholds based at least in part on any one or combination of device identification information 504, biometric identification information 506, action data 508, location data 510, temporal data 512, contextual data 514, and/or pattern data 516. For example, device identification information 504 and/or biometric identification information 506 of an individual may be compared to previously stored device identification information and/or biometric identification information to determine to what extent the device identification information 504 and/or biometric identification information 506 can be authenticated.

For example, biometric information 506 may be considered as more reliable identification information than device identification information 504, and, as such, detected biometric information 506 may increase the identification score more than detected device identification information 504 would increase the identification score. Various individuals may be associated with various collections of devices, device identifiers, and other device identification information 504. When the system detects device identification information, say a MAC address of computing device associated with a particular individual or a device having a valid WiFi password, the system may take that information as an indication of identity of the individual having that device information stored in the individuals profile. However, in some embodiments, the system may not deem an identification of the device alone as dispositive of individual's identity and may seek further evidence of the identity of the individual. Hence, the system may provide some measure of protection against an instance of a would-be intruder stealing a device and using the device to gain access to the home. Further, detected device identification information 504 may be considered as more reliable identification information than pattern-based identification that is based at least in part on action data 508, location data 510, temporal data 512, contextual data 514, and/or pattern data 516.

Even within a category of personalized data the various means of identification may be correlated to different probabilities and, hence, different identification scores. For example, with respect to biometric information 506, fingerprint identification data, received via a fingerprint scanner of the system, matching previously recorded fingerprint data for a member of the household could be correlated to a very high identification score, whereas a heat recognition data, received via a heat sensor of the system, could be correlated to a comparatively lower identification score. As another example, with respect to device identification information 504, certain embodiments may provide for a guest mode whereby a guest may be remotely authorized by an already authorized user. The guest may be given a code, a token, a partial key, a bar code for an optical reader, or some other evidence of authentication from an authenticated user, say via a device information sharing (e.g., a "bump" transfer—which may be a cloud-based or NFC-based transfer responsive to two devices being physically against each other), a text, or a call to the guest's smartphone. Further, the authorizing user may specify time/day restrictions for the guest access, and, the authorizing user may have the option to have the system notify the authorizing of an attempted guest access with a notification so that the authorizing user may confirm the guest access. Such remote authorization may be deemed as sufficient identification of the guest.

Accordingly, in various embodiments, the identification process 612 may be based at least in part on any one or combination of action determination 618, location determination 620, temporal determination 622, and/or contextual determination 624. The identification process 612 may employ a protocol order, such as a decision tree, checklist, workflow, and/or the like to capture various aspects of data and assess those aspects to infer individual qualification. Such a decision tree, checklist, and/or workflow may incorporate any one or combination of the depicted aspects and/or similar aspects in any desired order, according to various embodiments. For example, biometric information 506 may be considered as more reliable identification information than device identification information 504. As a consequence, the protocol order may include first checking for and processing any available biometric information 506 before checking for and processing any available device identification information 504.

For an individual positively identified as a particular member of a household, the system may proceed to effect home automation control 632 by instructing one or more home automation devices in accordance with that particular member's profile, which is stored by the system. The home automation control 632 may be based at least in part on the automation rules 628 which have been derived for the identified individual and stored in the personalization data store 326 in association with the individual's profile. Additionally, the home automation control 632 may be based at least in part on the currently determined actions 508, locations 510, temporal factors 512, and/or contextual factors 514 attributed to the identified individual, in conjunction with corresponding pattern(s) 516 attributed to the identified individual. Taking such factors into account, the system may determine automation rules 628 that include anticipating the needs of the individual using the particularized pattern of the individual. For example, the automation rules 628 may include specifying operational settings of home automation device in certain locations based at least in part on movements of the identified individual toward or away from those locations (such as turning on lights in a hallway when a first occupant walks from a living room toward a hallway during nighttime or other low-light conditions).

In some embodiments, pattern-based analysis may be implemented as a check on the identification process 612 that serves to confirm that the individual acts in conformity with what is expected for the individual identified with the identification process 612. For example, for an individual weakly identified as a particular member of a household, the system may prompt further authentication. For example, the system may cause one or more user notifications (push notifications, automated system voice announcements, pop-ups on a user interface communicatively coupled with the system, emails, automated phone calls, alarms, etc.) to be directed to one or more authenticated users, devices, and/or accounts based at least in part on information retained in the system's one or more information repositories. The system may require additional authentication, which could be captured consequent to the one or more user notifications. In addition or in alternative, the system may monitor the weakly identified individual for consistencies and/or inconsistencies with predetermined pattern(s) associated with that individual. In some embodiments, the system may proceed with home automation control 632 by instructing one or more home automation devices in accordance with that particular member's profile, whilst continuing to monitor the weakly identified individual for pattern conformance in order to flag situations that are out of character for the pattern(s). In the event of detected inconsistency with pattern(s), the system may prompt further authentication.

For an unknown individual who cannot be identified or sufficiently authenticated by the system, security measures may be taken. For example, the system may not unlock the exterior doors for such an unidentified individual when the individual is outside the home. In addition or in alternative, the system may cause one or more user notifications (push notifications, interactive voice announcements, pop-ups on a user interface of the system, emails, automated phone calls, alarms, etc.) to be directed to one or more authenticated users, devices, and/or accounts based at least in part on information retained in the system's one or more information repositories. The system may require additional authentication, which could be captured consequent to the one or more user notifications.

Some embodiments of the system may include one or more backup batteries to provide uninterrupted operation during power failure. Certain embodiments may further include one or more sensors configured to detect battery integrity, charge, lifecycle, replacement need, etc. Such sensors may also double as power failure sensors. For example, such sensors may trigger an alert notification to be sent out indicating that "Mom's" power just went out. If the backup battery does not power the Internet Router, such an alert may be sent via mobile card or phone line, RF, etc.

Figure 7:
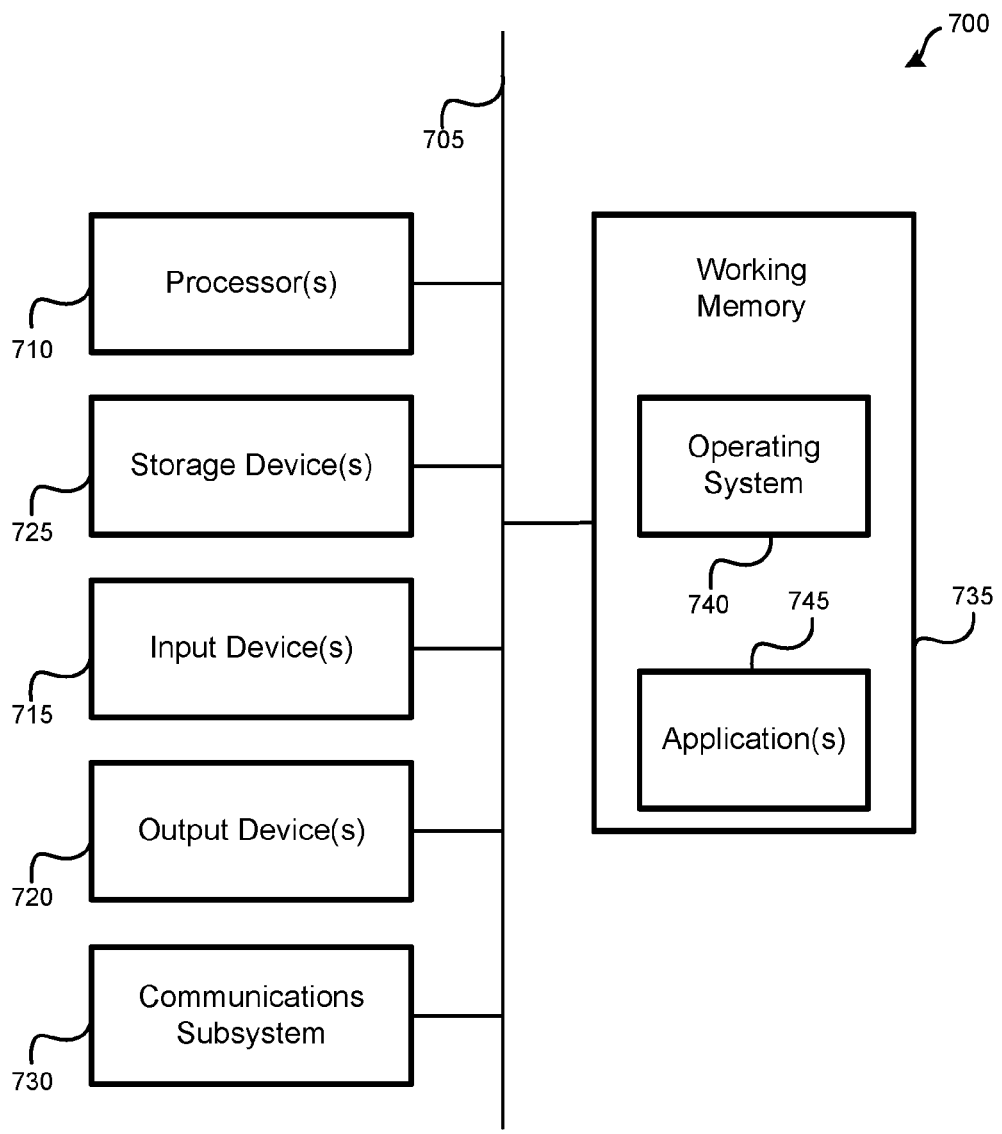
FIG. 7 illustrates an embodiment of a computer system, in accordance with certain embodiments of the present disclosure.

Turning now to FIG. 7, an example block diagram for a computer system or device 700 upon which various features of the present disclosure may be provided is shown. An example of a computer system or device includes an enterprise server, blade server, desktop computer, laptop computer, tablet computer, personal data assistant, smartphone, gaming console, STB, television receiver, and/or any other type of machine configured for performing calculations. Any particular one of the previously-described computing devices may be wholly or at least partially configured to exhibit features similar to the computer system 700, such as any of the respective elements of the foregoing figures. In this manner, any of one or more of the respective elements of the foregoing figures may be configured to perform and/or include instructions that, when executed, perform the methods and features disclosed above. Still further, any of one or more of the respective elements of the foregoing figures may be configured to perform and/or include instructions that, when executed, instantiate and implement functionality of the television receiver 150 and/or the server(s).

The computer system 700 is shown comprising hardware elements that may be electrically coupled via a bus 702 (or may otherwise be in communication, as appropriate). The hardware elements may include a processing unit with one or more processors 704, including without limitation one or more general-purpose processors and/or one or more special-purpose processors (such as digital signal processing chips, graphics acceleration processors, and/or the like); one or more input devices 715, which may include without limitation a remote control, a mouse, a keyboard, and/or the like; and one or more output devices 720, which may include without limitation a presentation device (e.g., television), a printer, and/or the like.

The computer system 700 may further include (and/or be in communication with) one or more non-transitory storage devices 710, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer system 700 might also include a communications subsystem 730, which may include without limitation a modem, a network card (wireless and/or wired), an infrared communication device, a wireless communication device and/or a chipset such as a Bluetooth™ device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 730 may permit data to be exchanged with a network (such as the network described below, to name one example), other computer systems, and/or any other devices described herein. In many embodiments, the computer system 700 will further comprise a working memory 735, which may include a random access memory and/or a read-only memory device, as described above.

The computer system 700 also may comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 725 described above. In some cases, the storage medium might be incorporated within a computer system, such as computer system 700. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 700) to perform methods in accordance with various embodiments of the disclosure. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 may cause the processor(s) 710 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 725. Volatile media may include, without limitation, dynamic memory, such as the working memory 735.

Example forms of physical and/or tangible computer-readable media may include a floppy disk, a flexible disk, hard disk, magnetic tape, or any other magnetic medium, a compact disc, any other optical medium, ROM, RAM, and etc., any other memory chip or cartridge, or any other medium from which a computer may read instructions and/or code. Various forms of computer-readable media may be involved in carrying one or more sequences of one or more instructions to the processor(s) 710 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed. As such, computer system 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed is:

1. A method for personalized home automation control based at least in part on individualized protocol, the method comprising:
   receiving, by a control system, first sensor data from a set of one or more sensors in operative communication with the control system;
   determining, by the control system, a particularized pattern of activity attributed to a user profile based at least in part on analyzing the first sensor data to correlate detected actions of an individual with corresponding locations, corresponding times, and corresponding device operations specified by the user profile;
   receiving, by the control system, second sensor data from at least one sensor of the set of one or more sensors, wherein the second sensor data is indicative of an unidentified individual that is sensed by the at least one sensor;
   accessing a set of one or more identification rules specified by a protocol record stored by the control system, the set of one or more identification rules comprising criteria for identifying sensed individuals;
   analyzing, by the control system, the second sensor data and/or identification information from another data source to identify the unidentified individual as corresponding to the user profile based at least in part on the criteria for identifying sensed individuals;
   responsive to identifying the unidentified individual as corresponding to the user profile, determining, by the control system, a home automation rule based at least in part on i) the second sensor data, ii) a first location of the identified individual, and iii) the particularized pattern attributed to the identified individual, wherein the home automation rule comprises an anticipation of an operational setting of a home automation device based at least in part on movement of the identified individual and the particularized pattern; and
   instructing, by the control system, the home automation device based at least in part on the determined home automation rule via a home automation network.

2. The method for personalized home automation control based at least in part on individualized protocol of claim 1, wherein the home automation device is in the first location, and the anticipation of the operational setting is based at least in part on the movement of the identified individual being directed away from the first location.

3. The method for personalized home automation control based at least in part on individualized protocol of claim 1, wherein the home automation device is in a second location, and the anticipation of the operational setting is based at least in part on the movement of the identified individual being directed toward the second location.

4. The method for personalized home automation control based at least in part on individualized protocol of claim 1, further comprising:
   generating a characterization of the unidentified individual based at least in part on i) the second sensor data and ii) the criteria for identifying sensed individuals; and
   consequent to the characterization of the individual corresponding to an insufficient identification, analyzing third sensor data and/or the identification information from another data source to identify the unidentified individual as corresponding to the identified individual based at least in part on the criteria for identifying sensed individuals.

5. The method for personalized home automation control based at least in part on individualized protocol of claim 1, further comprising:
   generating a characterization of the unidentified individual based at least in part on i) the second sensor data and ii) the criteria for identifying sensed individuals;
   consequent to the characterization of the individual corresponding to an insufficient identification, transmitting, by the control system, one or more notifications to one or more authenticated devices and/or registered accounts, the notifications indicative of the insufficient identification;

processing, by the control system, one or more user selections corresponding to one or more user-selection options, the one or more user selections responsive to the one or more notifications;

wherein the identifying the unidentified individual as corresponding to the identified individual is based at least in part on the one or more user selections.

6. The method for personalized home automation control based at least in part on individualized protocol of claim 1, wherein the determining the particularized pattern of activity attributed to the identified individual comprises:

receiving a first subset of the first sensor data from at least one sensor of the set of one or more sensors;

based at least in part on the first subset of the first sensor data, identifying a first movement of the identified individual with respect to a reference location during a first time period;

identifying a first operational state change of the home automation device, within the first time period caused by the identified individual, consequent to the first movement;

correlating the first movement of the identified individual with respect to a reference location to the first operational state change of the home automation device;

receiving a second subset of the first sensor data from at least one sensor of the set of one or more sensors;

based at least in part on the second subset of the first sensor data, identifying a second movement of the identified individual with respect to the reference location during a second time period;

identifying a second operational state change of the home automation device caused by the identified individual, within the second time period, consequent to the second movement;

correlating the second movement of the identified individual with respect to the reference location to the second operational state change of the home automation device;

determining that the first movement, the first time period, and the first operational state change of the home automation device match the second movement, the second time period, and the second operational state change of the home automation device based at least in part on a matching threshold being satisfied; and consequent to the determined match, deriving the home automation rule where the home automation rule comprises associating a trigger for the operational setting of the home automation device with movement criteria and time criteria corresponding to the first movement, the first time period, the first operational state change of the home automation device, the second time period, and the second operational state change of the home automation device.

7. The method for personalized home automation control based at least in part on individualized protocol of claim 1, wherein the receiving the first sensor data from the set of one or more sensors in operative communication with the control system comprises monitoring one or more authenticated devices utilizing an application programming interface that recognizes the one or more authenticated devices and facilitates data collection from the one or more authenticated devices.

8. A system for personalized home automation control based at least in part on individualized protocol, the system comprising:

one or more control devices configured to communicatively couple to a set of one or more audio sensors, the one or more control devices comprising:

one or more processors; and a memory communicatively coupled with and readable by the one or more processors and having stored therein processor-readable instructions which, when executed by the one or more processors, cause the one or more control devices to perform:

receiving first sensor data from a set of one or more sensors in operative communication with the one or more control devices;

determining a particularized pattern of activity attributed to a user profile based at least in part on analyzing the first sensor data to correlate detected actions of an individual with corresponding locations, corresponding times, and corresponding device operations specified by the user profile;

receiving second sensor data from at least one sensor of the set of one or more sensors, wherein the second sensor data is indicative of an unidentified individual that is sensed by the at least one sensor;

accessing a set of one or more identification rules specified by a stored protocol record, the set of one or more identification rules comprising criteria for identifying sensed individuals;

analyzing the second sensor data and/or identification information from another data source to identify the unidentified individual as corresponding to the user profile based at least in part on the criteria for identifying sensed individuals;

responsive to identifying the unidentified individual as corresponding to the user profile, determining a home automation rule based at least in part on i) the second sensor data, ii) a first location of the identified individual, and iii) the particularized pattern attributed to the identified individual, wherein the home automation rule comprises an anticipation of an operational setting of a home automation device based at least in part on movement of the identified individual and the particularized pattern; and instructing the home automation device based at least in part on the determined home automation rule via a home automation network.

9. The system for personalized home automation control based at least in part on individualized protocol of claim 8, wherein the home automation device is in the first location, and the anticipation of the operational setting is based at least in part on the movement of the identified individual being directed away from the first location.

10. The system for personalized home automation control based at least in part on individualized protocol of claim 8, wherein the home automation device is in a second location, and the anticipation of the operational setting is based at least in part on the movement of the identified individual being directed toward the second location.

11. The system for personalized home automation control based at least in part on individualized protocol of claim 8, the one or more control devices further to perform:

generating a characterization of the unidentified individual based at least in part on i) the second sensor data and ii) the criteria for identifying sensed individuals; and consequent to the characterization of the individual corresponding to an insufficient identification, analyzing third sensor data and/or the identification information from another data source to identify the unidentified individual as corresponding to the identified individual based at least in part on the criteria for identifying sensed individuals.

12. The system for personalized home automation control based at least in part on individualized protocol of claim 8, the one or more control devices further to perform:
generating a characterization of the unidentified individual based at least in part on i) the second sensor data and ii) the criteria for identifying sensed individuals;
consequent to the characterization of the individual corresponding to an insufficient identification, transmitting one or more notifications to one or more authenticated devices and/or registered accounts, the notifications indicative of the insufficient identification;
processing one or more user selections corresponding to one or more user-selection options, the one or more user selections responsive to the one or more notifications;
wherein the identifying the unidentified individual as corresponding to the identified individual is based at least in part on the one or more user selections.

13. The system for personalized home automation control based at least in part on individualized protocol of claim 8, wherein the determining the particularized pattern of activity attributed to the identified individual comprises:
receiving a first subset of the first sensor data from at least one sensor of the set of one or more sensors;
based at least in part on the first subset of the first sensor data, identifying a first movement of the identified individual with respect to a reference location during a first time period;
identifying a first operational state change of the home automation device, within the first time period caused by the identified individual, consequent to the first movement;
correlating the first movement of the identified individual with respect to a reference location to the first operational state change of the home automation device;
receiving a second subset of the first sensor data from at least one sensor of the set of one or more sensors;
based at least in part on the second subset of the first sensor data, identifying a second movement of the identified individual with respect to the reference location during a second time period;
identifying a second operational state change of the home automation device caused by the identified individual, within the second time period, consequent to the second movement;
correlating the second movement of the identified individual with respect to the reference location to the second operational state change of the home automation device;
determining that the first movement, the first time period, and the first operational state change of the home automation device match the second movement, the second time period, and the second operational state change of the home automation device based at least in part on a matching threshold being satisfied; and
consequent to the determined match, deriving the home automation rule where the home automation rule comprises associating a trigger for the operational setting of the home automation device with movement criteria and time criteria corresponding to the first movement, the first time period, the first operational state change of the home automation device, the second time period, and the second operational state change of the home automation device.

14. The system for personalized home automation control based at least in part on individualized protocol of claim 8, wherein the receiving the first sensor data from the set of one or more sensors in operative communication with the one or more control devices comprises monitoring one or more authenticated devices utilizing an application programming interface that recognizes the one or more authenticated devices and facilitates data collection from the one or more authenticated devices.

15. One or more non-transitory, machine-readable media having machine-readable instructions thereon which, when executed by one or more processing devices, facilitates personalized home automation control based at least in part on individualized protocol, causing the one or more processing devices to perform;
receiving first sensor data from a set of one or more sensors in operative communication with the one or more processing devices;
determining a particularized pattern of activity attributed to a user profile based at least in part on analyzing the first sensor data to correlate detected actions of an individual with corresponding locations, corresponding times, and corresponding device operations specified by the user profile;
receiving second sensor data from at least one sensor of the set of one or more sensors, wherein the second sensor data is indicative of an unidentified individual that is sensed by the at least one sensor;
accessing a set of one or more identification rules specified by a protocol record stored in storage communicatively coupled to the one or more processing devices, the set of one or more identification rules comprising criteria for identifying sensed individuals;
analyzing the second sensor data and/or identification information from another data source to identify the unidentified individual as corresponding to the user profile based at least in part on the criteria for identifying sensed individuals;
responsive to identifying the unidentified individual as corresponding to the user profile, determining a home automation rule based at least in part on i) the second sensor data, ii) a first location of the identified individual, and iii) the particularized pattern attributed to the identified individual, wherein the home automation rule comprises an anticipation of an operational setting of a home automation device based at least in part on movement of the identified individual and the particularized pattern; and
instructing the home automation device based at least in part on the determined home automation rule via a home automation network.

16. The one or more non-transitory, machine-readable media of claim 15, wherein the home automation device is in the first location, and the anticipation of the operational setting is based at least in part on the movement of the identified individual being directed away from the first location.

17. The one or more non-transitory, machine-readable media of claim 15, wherein the home automation device is in a second location, and the anticipation of the operational setting is based at least in part on the movement of the identified individual being directed toward the second location.

18. The one or more non-transitory, machine-readable media of claim 15, wherein the instructions further cause the one or more processing devices to:
  generating a characterization of the unidentified individual based at least in part on i) the second sensor data and ii) the criteria for identifying sensed individuals; and
  consequent to the characterization of the individual corresponding to an insufficient identification, analyzing third sensor data and/or the identification information from another data source to identify the unidentified individual as corresponding to the identified individual based at least in part on the criteria for identifying sensed individuals.

19. The one or more non-transitory, machine-readable media of claim 15, wherein the instructions further cause the one or more processing devices to:
  generating a characterization of the unidentified individual based at least in part on i) the second sensor data and ii) the criteria for identifying sensed individuals;
  consequent to the characterization of the individual corresponding to an insufficient identification, transmitting one or more notifications to one or more authenticated devices and/or registered accounts, the notifications indicative of the insufficient identification;
  processing one or more user selections corresponding to one or more user-selection options, the one or more user selections responsive to the one or more notifications;
  wherein the identifying the unidentified individual as corresponding to the identified individual is based at least in part on the one or more user selections.

20. The one or more non-transitory, machine-readable media of claim 15, wherein the determining the particularized pattern of activity attributed to the identified individual comprises:
  receiving a first subset of the first sensor data from at least one sensor of the set of one or more sensors;
  based at least in part on the first subset of the first sensor data, identifying a first movement of the identified individual with respect to a reference location during a first time period;
  identifying a first operational state change of the home automation device, within the first time period caused by the identified individual, consequent to the first movement;
  correlating the first movement of the identified individual with respect to a reference location to the first operational state change of the home automation device;
  receiving a second subset of the first sensor data from at least one sensor of the set of one or more sensors;
  based at least in part on the second subset of the first sensor data, identifying a second movement of the identified individual with respect to the reference location during a second time period;
  identifying a second operational state change of the home automation device caused by the identified individual, within the second time period, consequent to the second movement;
  correlating the second movement of the identified individual with respect to the reference location to the second operational state change of the home automation device;
  determining that the first movement, the first time period, and the first operational state change of the home automation device match the second movement, the second time period, and the second operational state change of the home automation device based at least in part on a matching threshold being satisfied; and
  consequent to the determined match, deriving the home automation rule where the home automation rule comprises associating a trigger for the operational setting of the home automation device with movement criteria and time criteria corresponding to the first movement, the first time period, the first operational state change of the home automation device, the second time period, and the second operational state change of the home automation device.

* * * * *